US012794054B2

(12) United States Patent
Isaka et al.

(10) Patent No.: US 12,794,054 B2
(45) **Date of Patent: *Nov. 10, 2026**

(54) SEALING MEMBER AND POWER STORAGE BODY

(71) Applicant: DAIKIN INDUSTRIES, LTD., Osaka (JP)

(72) Inventors: Tadaharu Isaka, Osaka (JP); Hayato Tsuda, Osaka (JP); Yumi Zenke, Osaka (JP); Yukari Yamamoto, Osaka (JP); Takahisa Aoyama, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 557 days.

This patent is subject to a terminal disclaimer.

(21) Appl. No.: 18/192,077

(22) Filed: Mar. 29, 2023

(65) Prior Publication Data

US 2023/0238629 A1 Jul. 27, 2023

Related U.S. Application Data

(63) Continuation of application No. PCT/JP2021/036309, filed on Sep. 30, 2021.

(30) Foreign Application Priority Data

Sep. 30, 2020 (JP) ................................ 2020-166536

(51) Int. Cl.
*H01M 10/00* (2006.01)
*B29C 45/00* (2006.01)
(Continued)

(52) U.S. Cl.
CPC ....... *H01M 50/193* (2021.01); *B29C 45/0001* (2013.01); *C08F 114/26* (2013.01);
(Continued)

(58) Field of Classification Search
CPC ............. H01M 50/193; H01M 50/176; H01M 50/184; H01M 50/188; H01M 50/198;
(Continued)

(56) References Cited

U.S. PATENT DOCUMENTS 3,635,926 A 1/1972 Gresham et al.
3,945,786 A 3/1976 Bishop
(Continued)

FOREIGN PATENT DOCUMENTS

CN 1527852 A 9/2004
CN 1599757 A 3/2005
(Continued)

OTHER PUBLICATIONS

International Preliminary Report on Patentability, with Translation of Written Opinion issued Mar. 28, 2023 in International Application No. PCT/JP2021/036301.
(Continued)

*Primary Examiner* — Nicholas P D'Aniello
(74) *Attorney, Agent, or Firm* — Sughrue Mion, PLLC

(57) ABSTRACT

A sealing member containing a copolymer containing tetrafluoroethylene unit and a perfluoro(propyl vinyl ether) unit, wherein the copolymer has a content of the perfluoro (propyl vinyl ether) unit of 4.0 to 6.0% by mass with respect to the whole of the monomer units, a melt flow rate of 26 to 37 g/10 min, and the number of functional groups of $—CF{=}CF_2$, $—CF_2H$, —COF, —COOH, $—COOCH_3$, $—CONH_2$ and $—CH_2OH$ of more than 50 per $10^6$ main-chain carbon atoms, wherein the sealing member has a thickness of 0.5 to 2.5 mm and a sealing area of 0.5 to 50 $cm^2$, and wherein the sealing member is in a state of being compressed at a compression deformation rate of 20 to 60%. Also disclosed is a power storage assembly including the sealing member.

8 Claims, 5 Drawing Sheets

(51) Int. Cl.

| | |
|---|---|
| ***C08F 114/26*** | (2006.01) |
| ***C08F 214/26*** | (2006.01) |
| ***C08L 27/18*** | (2006.01) |
| ***C09D 127/18*** | (2006.01) |
| ***C09D 127/20*** | (2006.01) |
| ***C09K 3/10*** | (2006.01) |
| ***H01B 3/44*** | (2006.01) |
| ***H01G 11/80*** | (2013.01) |
| ***H01M 50/176*** | (2021.01) |
| ***H01M 50/184*** | (2021.01) |
| ***H01M 50/188*** | (2021.01) |
| ***H01M 50/193*** | (2021.01) |
| ***H01M 50/198*** | (2021.01) |
| *B29K 27/18* | (2006.01) |

(52) U.S. Cl.
CPC .......... *C08F 214/262* (2013.01); *C08L 27/18* (2013.01); *C09D 127/18* (2013.01); *C09D 127/20* (2013.01); *C09K 3/1009* (2013.01); *H01B 3/445* (2013.01); *H01G 11/80* (2013.01); *H01M 50/176* (2021.01); *H01M 50/184* (2021.01); *H01M 50/188* (2021.01); *H01M 50/198* (2021.01); *B29K 2027/18* (2013.01); *C08L 2205/025* (2013.01)

(58) Field of Classification Search
CPC ............... B29C 45/0001; C08F 114/26; C08F 214/262; C08L 27/18; C08L 2205/025; C09D 127/18; C09D 127/20; C09K 3/1009; H01B 3/445; H01G 11/80; B29K 2027/18
See application file for complete search history.

(56) References Cited

U.S. PATENT DOCUMENTS

| | | | | |
|---|---|---|---|---|
| 4,029,868 | A | 6/1977 | Carlson | |
| 4,262,101 | A | 4/1981 | Hartwimmer et al. | |
| 4,414,356 | A | 11/1983 | Michel | |
| 4,510,300 | A | 4/1985 | Levy | |
| 4,743,658 | A | 5/1988 | Imbalzano et al. | |
| 4,902,444 | A | 2/1990 | Kolouch | |
| 4,999,221 | A | 3/1991 | Eigenbrod et al. | |
| 5,000,875 | A | 3/1991 | Kolouch | |
| 5,656,392 | A | 8/1997 | Sano et al. | |
| 5,703,185 | A | 12/1997 | Blair | |
| 5,767,198 | A | 6/1998 | Shimizu et al. | |
| 5,851,693 | A | 12/1998 | Sano et al. | |
| 6,066,707 | A | 5/2000 | Colaianna et al. | |
| 6,069,215 | A | 5/2000 | Araki et al. | |
| 6,096,795 | A | 8/2000 | Abusleme et al. | |
| 6,689,833 | B1 | 2/2004 | Bidstrup et al. | |
| 6,713,183 | B2 | 3/2004 | Araki et al. | |
| 6,740,375 | B1 | 5/2004 | Sagisaka et al. | |
| 6,774,196 | B1 | 8/2004 | Taira et al. | |
| 8,143,351 | B2 | 3/2012 | Shiotsuki et al. | |
| 8,252,458 | B2 * | 8/2012 | Schubert ............... | H01M 4/581 429/231.95 |
| 11,826,975 | B2 | 11/2023 | Imamura et al. | |
| 2002/0011692 | A1 | 1/2002 | Lahijani | |
| 2002/0099143 | A1 | 7/2002 | Namura | |
| 2002/0167115 | A1 | 11/2002 | Tanaka | |
| 2003/0013791 | A1 | 1/2003 | Blong et al. | |
| 2003/0109646 | A1 | 6/2003 | Kubo et al. | |
| 2003/0114615 | A1 | 6/2003 | Sumi et al. | |
| 2003/0190530 | A1 | 10/2003 | Yang et al. | |
| 2003/0216531 | A1 | 11/2003 | Aten et al. | |
| 2004/0072935 | A1 | 4/2004 | Blong et al. | |
| 2004/0102572 | A1 | 5/2004 | Kubo et al. | |
| 2004/0204536 | A1 | 10/2004 | Miyatani et al. | |
| 2004/0260044 | A1 | 12/2004 | Earnest, Jr. et al. | |
| 2005/0020792 | A1 | 1/2005 | Aoyama et al. | |
| 2005/0245626 | A1 | 11/2005 | Hoaglund et al. | |
| 2007/0112155 | A1 | 5/2007 | Takase et al. | |
| 2007/0149734 | A1 | 6/2007 | Sakakibara et al. | |
| 2007/0281166 | A1 | 12/2007 | Nishio | |
| 2007/0292685 | A1 | 12/2007 | Brothers et al. | |
| 2008/0038627 | A1 | 2/2008 | Yamauchi et al. | |
| 2008/0114143 | A1 | 5/2008 | Brothers et al. | |
| 2008/0241534 | A1 | 10/2008 | Ohtani et al. | |
| 2009/0038821 | A1 | 2/2009 | Sato et al. | |
| 2009/0044965 | A1 | 2/2009 | Kono et al. | |
| 2009/0176952 | A1 | 7/2009 | Funaki et al. | |
| 2009/0246435 | A1 | 10/2009 | Shimono et al. | |
| 2010/0063214 | A1 | 3/2010 | Kasahara et al. | |
| 2010/0212929 | A1 | 8/2010 | Ishii et al. | |
| 2010/0273047 | A1 | 10/2010 | Kunoike et al. | |
| 2010/0314153 | A1 | 12/2010 | Ishii et al. | |
| 2010/0314154 | A1 | 12/2010 | Kitahara et al. | |
| 2011/0052970 | A1 | 3/2011 | Kurata et al. | |
| 2011/0052977 | A1 | 3/2011 | Kurata et al. | |
| 2011/0104562 | A1 | 5/2011 | Byun et al. | |
| 2011/0203830 | A1 | 8/2011 | Kono et al. | |
| 2011/0272173 | A1 | 11/2011 | Shiotsuki et al. | |
| 2012/0035329 | A1 | 2/2012 | Isogai et al. | |
| 2012/0064273 | A1 | 3/2012 | Bacino | |
| 2012/0094169 | A1 | 4/2012 | Kim et al. | |
| 2013/0046058 | A1 | 2/2013 | Pham et al. | |
| 2013/0130100 | A1 | 5/2013 | Kurata et al. | |
| 2014/0227533 | A1 | 8/2014 | Murakami et al. | |
| 2014/0287177 | A1 | 9/2014 | Suda et al. | |
| 2014/0378616 | A1 | 12/2014 | Nakano et al. | |
| 2015/0041145 | A1 | 2/2015 | Colaianna et al. | |
| 2015/0148481 | A1 | 5/2015 | Brothers et al. | |
| 2015/0158988 | A1 | 6/2015 | Sawaki et al. | |
| 2015/0322187 | A1 | 11/2015 | Miele et al. | |
| 2015/0353700 | A1 | 12/2015 | Isaka et al. | |
| 2016/0006004 | A1 | 1/2016 | Ogawa et al. | |
| 2016/0078979 | A1 | 3/2016 | Hosoda et al. | |
| 2016/0108159 | A1 | 4/2016 | Sekiguchi et al. | |
| 2016/0194491 | A1 | 7/2016 | Taguchi et al. | |
| 2016/0272805 | A1 | 9/2016 | Nakanishi et al. | |
| 2016/0319089 | A1 | 11/2016 | Imamura et al. | |
| 2016/0322128 | A1 | 11/2016 | Imamura et al. | |
| 2016/0340455 | A1 | 11/2016 | Abe et al. | |
| 2017/0008986 | A1 | 1/2017 | Isaka et al. | |
| 2017/0025204 | A1 | 1/2017 | Chapman et al. | |
| 2017/0154707 | A1 | 6/2017 | Abe et al. | |
| 2017/0214037 | A1 | 7/2017 | Uematsu et al. | |
| 2017/0260344 | A1 | 9/2017 | Imamura et al. | |
| 2018/0009204 | A1 | 1/2018 | Higuchi et al. | |
| 2018/0036931 | A1 | 2/2018 | Higuchi et al. | |
| 2018/0237566 | A1 | 8/2018 | Aida et al. | |
| 2018/0265654 | A1 | 9/2018 | Imamura et al. | |
| 2018/0283590 | A1 | 10/2018 | Yokoyama et al. | |
| 2019/0134939 | A1 | 5/2019 | Colaianna et al. | |
| 2019/0143628 | A1 | 5/2019 | Colaianna et al. | |
| 2019/0177453 | A1 | 6/2019 | Isaka et al. | |
| 2019/0193315 | A1 | 6/2019 | Miyamoto et al. | |
| 2019/0273240 | A1 * | 9/2019 | Hagino .............. | B23K 20/2333 |
| 2019/0375929 | A1 | 12/2019 | Nishimura et al. | |
| 2019/0382544 | A1 | 12/2019 | Yokotani et al. | |
| 2020/0332037 | A1 | 10/2020 | Isaka et al. | |
| 2021/0008827 | A1 | 1/2021 | Colaianna et al. | |
| 2021/0008828 | A1 | 1/2021 | Colaianna et al. | |
| 2021/0024709 | A1 | 1/2021 | Fukushima et al. | |
| 2021/0024769 | A1 | 1/2021 | Imamura et al. | |
| 2021/0189031 | A1 | 6/2021 | Hintzer et al. | |
| 2021/0246237 | A1 | 8/2021 | Isaka et al. | |
| 2021/0269568 | A1 | 9/2021 | Imamura et al. | |
| 2022/0001657 | A1 | 1/2022 | Kikuchi et al. | |
| 2022/0033636 | A1 | 2/2022 | Nishimura et al. | |
| 2022/0170573 | A1 | 6/2022 | Imamura et al. | |
| 2022/0181689 | A1 | 6/2022 | Isaka et al. | |
| 2022/0181698 | A1 | 6/2022 | Isaka et al. | |
| 2022/0181729 | A1 | 6/2022 | Isaka et al. | |
| 2022/0195088 | A1 | 6/2022 | Imamura et al. | |
| 2022/0213996 | A1 | 7/2022 | Imamura et al. | |
| 2022/0266485 | A1 | 8/2022 | Tsuda et al. | |
| 2022/0278403 | A1 | 9/2022 | Tsuda et al. | |
| 2023/0227594 | A1 | 7/2023 | Yamamoto et al. | |

(56) References Cited

U.S. PATENT DOCUMENTS

| | | | |
|---|---|---|---|
| 2023/0235107 | A1 | 7/2023 | Isaka et al. |
| 2023/0235159 | A1 | 7/2023 | Isaka et al. |
| 2023/0235160 | A1 | 7/2023 | Isaka et al. |
| 2023/0238627 | A1 | 7/2023 | Isaka et al. |
| 2023/0238628 | A1 | 7/2023 | Zenke et al. |
| 2023/0272136 | A1 | 8/2023 | Zenke et al. |
| 2023/0295356 | A1 | 9/2023 | Isaka et al. |
| 2023/0344077 | A1 | 10/2023 | Qiu et al. |
| 2023/0383031 | A1 | 11/2023 | Isaka et al. |
| 2023/0383032 | A1 | 11/2023 | Isaka et al. |
| 2023/0383033 | A1 | 11/2023 | Zenke et al. |
| 2023/0383034 | A1 | 11/2023 | Isaka et al. |
| 2023/0390977 | A1 | 12/2023 | Hamada et al. |
| 2023/0390978 | A1 | 12/2023 | Tsuda et al. |
| 2023/0390979 | A1 | 12/2023 | Tsuda et al. |
| 2023/0390980 | A1 | 12/2023 | Tsuda et al. |
| 2023/0390981 | A1 | 12/2023 | Tsuda et al. |
| 2023/0391909 | A1 | 12/2023 | Isaka et al. |
| 2023/0391910 | A1 | 12/2023 | Isaka et al. |
| 2023/0391911 | A1 | 12/2023 | Isaka et al. |
| 2023/0391912 | A1 | 12/2023 | Isaka et al. |
| 2023/0391917 | A1 | 12/2023 | Isaka et al. |
| 2023/0391920 | A1 | 12/2023 | Isaka et al. |
| 2023/0391927 | A1 | 12/2023 | Isaka |
| 2023/0391929 | A1 | 12/2023 | Isaka et al. |
| 2023/0391931 | A1 | 12/2023 | Isaka et al. |
| 2023/0391932 | A1 | 12/2023 | Isaka et al. |
| 2023/0391933 | A1 | 12/2023 | Isaka et al. |
| 2023/0392737 | A1 | 12/2023 | Tsuda et al. |
| 2023/0395282 | A1 | 12/2023 | Isaka et al. |
| 2023/0399431 | A1 | 12/2023 | Isaka et al. |
| 2023/0399432 | A1 | 12/2023 | Isaka et al. |
| 2023/0399438 | A1 | 12/2023 | Isaka et al. |
| 2023/0399441 | A1 | 12/2023 | Isaka et al. |
| 2023/0399443 | A1 | 12/2023 | Isaka et al. |
| 2023/0406975 | A1 | 12/2023 | Isaka et al. |
| 2023/0406976 | A1 | 12/2023 | Isaka et al. |
| 2023/0411751 | A1 | 12/2023 | Tsuda et al. |
| 2023/0415387 | A1 | 12/2023 | Hamada et al. |
| 2025/0002728 | A1 | 1/2025 | Zenke et al. |
| 2025/0011488 | A1 | 1/2025 | Isaka et al. |
| 2025/0011490 | A1 | 1/2025 | Isaka et al. |
| 2025/0011494 | A1 | 1/2025 | Isaka et al. |
| 2025/0011496 | A1 | 1/2025 | Yamamoto et al. |
| 2025/0011498 | A1 | 1/2025 | Isaka et al. |
| 2025/0011499 | A1 | 1/2025 | Isaka et al. |
| 2025/0011500 | A1 | 1/2025 | Isaka et al. |
| 2025/0019476 | A1 | 1/2025 | Isaka et al. |
| 2025/0034302 | A1 | 1/2025 | Isaka et al. |

FOREIGN PATENT DOCUMENTS

| | | | |
|---|---|---|---|
| CN | 101364456 | A | 2/2009 |
| CN | 103946250 | A | 7/2014 |
| CN | 107428144 | A | 12/2017 |
| CN | 109476061 | A | 3/2019 |
| CN | 110712348 | A | 1/2020 |
| CN | 110790854 | A | 2/2020 |
| CN | 114223086 | A | 3/2022 |
| CN | 114258609 | A | 3/2022 |
| CN | 116390957 | A | 7/2023 |
| CN | 116867821 | A | 10/2023 |
| CN | 116917346 | A | 10/2023 |
| EP | 0 220 910 | A2 | 5/1987 |
| EP | 0 423 995 | A1 | 4/1991 |
| EP | 0 976 544 | A1 | 2/2000 |
| EP | 1 260 526 | A1 | 11/2002 |
| EP | 1 462 458 | A1 | 9/2004 |
| EP | 3 816 214 | A1 | 5/2021 |
| EP | 4 024 550 | A1 | 7/2022 |
| EP | 4 024 575 | A1 | 7/2022 |
| EP | 4 223 793 | A1 | 8/2023 |
| EP | 4 223 794 | A1 | 8/2023 |
| GB | 1210794 | A | 10/1970 |
| JP | 48-20788 | B1 | 6/1973 |
| JP | 58-132512 | A | 8/1983 |
| JP | 58-191127 | A | 11/1983 |
| JP | 59-120433 | A | 7/1984 |
| JP | 62-104822 | A | 5/1987 |
| JP | 62-53019 | B2 | 11/1987 |
| JP | 1-53167 | B2 | 11/1989 |
| JP | 2-129253 | A | 5/1990 |
| JP | 3-184209 | A | 8/1991 |
| JP | 3-247609 | A | 11/1991 |
| JP | 4-357398 | A | 12/1992 |
| JP | 6-1902 | A | 1/1994 |
| JP | 6-40813 | B2 | 6/1994 |
| JP | 6-287405 | A | 10/1994 |
| JP | 7-16869 | A | 1/1995 |
| JP | 7-112449 | A | 5/1995 |
| JP | 7-188337 | A | 7/1995 |
| JP | 7-290496 | A | 11/1995 |
| JP | 8-207106 | A | 8/1996 |
| JP | 8-321287 | A | 12/1996 |
| JP | 9-245832 | A | 9/1997 |
| JP | 10-87746 | A | 4/1998 |
| JP | 10-158456 | A | 6/1998 |
| JP | 10-275604 | A | 10/1998 |
| JP | 10-292054 | A | 11/1998 |
| JP | 2001-151825 | A | 6/2001 |
| JP | 2001-151826 | A | 6/2001 |
| JP | 2001-283907 | A | 10/2001 |
| JP | 2001-283921 | A | 10/2001 |
| JP | 2002-53620 | A | 2/2002 |
| JP | 2002-63934 | A | 2/2002 |
| JP | 2002-167488 | A | 6/2002 |
| JP | 2003-327770 | A | 11/2003 |
| JP | 2003-534940 | A | 11/2003 |
| JP | 2004-256406 | A | 9/2004 |
| JP | 2004-534131 | A | 11/2004 |
| JP | 2005-523979 | A | 8/2005 |
| JP | 2005-298659 | A | 10/2005 |
| JP | 2005-320497 | A | 11/2005 |
| JP | 2006-117912 | A | 5/2006 |
| JP | 2006-312736 | A | 11/2006 |
| JP | 2007-238960 | A | 9/2007 |
| JP | 2008-66254 | A | 3/2008 |
| JP | 2009-42478 | A | 2/2009 |
| JP | 2009-59690 | A | 3/2009 |
| JP | 2009-235564 | A | 10/2009 |
| JP | 2009-272207 | A | 11/2009 |
| JP | 2010-56079 | A | 3/2010 |
| JP | 2010-509443 | A | 3/2010 |
| JP | 2010-85741 | A | 4/2010 |
| JP | 2010-162817 | A | 7/2010 |
| JP | 2010-235667 | A | 10/2010 |
| JP | 2011-48976 | A | 3/2011 |
| JP | 2011-71104 | A | 4/2011 |
| JP | 2012-54269 | A | 3/2012 |
| JP | 2012-80911 | A | 4/2012 |
| JP | 2012-106494 | A | 6/2012 |
| JP | 2012-130557 | A | 7/2012 |
| JP | 2013-71341 | A | 4/2013 |
| JP | 2013-82888 | A | 5/2013 |
| JP | 2013-177574 | A | 9/2013 |
| JP | 2014-28951 | A | 2/2014 |
| JP | 2014-59052 | A | 4/2014 |
| JP | 2014-187040 | A | 10/2014 |
| JP | 2015-7218 | A | 1/2015 |
| JP | 2015-519410 | A | 7/2015 |
| JP | 2015-147924 | A | 8/2015 |
| JP | 2015-168840 | A | 9/2015 |
| JP | 2016-537499 | A | 12/2016 |
| JP | 2017-197690 | A | 11/2017 |
| JP | 2018-20468 | A | 2/2018 |
| JP | 2018-514598 | A | 6/2018 |
| JP | 2018-523272 | A | 8/2018 |
| JP | 2018-159090 | A | 10/2018 |
| JP | 2019-172962 | A | 10/2019 |
| JP | 2019-210420 | A | 12/2019 |
| JP | 2019-214641 | A | 12/2019 |
| JP | 2020-2341 | A | 1/2020 |
| JP | 2020-15906 | A | 1/2020 |
| JP | 2020-29042 | A | 2/2020 |

(56) References Cited

FOREIGN PATENT DOCUMENTS

| | | | |
|---|---|---|---|
| JP | 2020-100823 | A | 7/2020 |
| JP | 2020-100843 | A | 7/2020 |
| JP | 2021-6648 | A | 1/2021 |
| JP | 2021-141043 | A | 9/2021 |
| JP | 2021-141045 | A | 9/2021 |
| JP | 2022-19196 | A | 1/2022 |
| KR | 10-2004-0071160 | A | 8/2004 |
| KR | 10-2013-0069652 | A1 | 6/2013 |
| KR | 10-2019-0034205 | A | 4/2019 |
| WO | 95/29956 | A1 | 11/1995 |
| WO | 01/40331 | A1 | 6/2001 |
| WO | 03/006566 | A1 | 1/2003 |
| WO | 03/048214 | A1 | 6/2003 |
| WO | 2004/052987 | A1 | 6/2004 |
| WO | 2008/032613 | A1 | 3/2008 |
| WO | 2008/047759 | A1 | 4/2008 |
| WO | 2008/047906 | A1 | 4/2008 |
| WO | 2008/143069 | A1 | 11/2008 |
| WO | 2010/113864 | A1 | 10/2010 |
| WO | 2013/115374 | A1 | 8/2013 |
| WO | 2014/007346 | A1 | 1/2014 |
| WO | 2014/129413 | A1 | 8/2014 |
| WO | 2015/119053 | A1 | 8/2015 |
| WO | 2016/117492 | A1 | 7/2016 |
| WO | 2017/056203 | A1 | 4/2017 |
| WO | 2017/082417 | A1 | 5/2017 |
| WO | 2019/003265 | A1 | 1/2019 |
| WO | 2019/187725 | A1 | 10/2019 |
| WO | 2019/189316 | A1 | 10/2019 |
| WO | 2019/208492 | A1 | 10/2019 |
| WO | 2020/004083 | A1 | 1/2020 |
| WO | 2020/090981 | A1 | 5/2020 |
| WO | 2020/130144 | A1 | 6/2020 |
| WO | 2020/204163 | A1 | 10/2020 |
| WO | 2021/033539 | A1 | 2/2021 |
| WO | 2021/039861 | A1 | 3/2021 |
| WO | 2021/039862 | A1 | 3/2021 |
| WO | 2021/039863 | A1 | 3/2021 |
| WO | 2021/039865 | A1 | 3/2021 |
| WO | 2021039864 | A1 | 3/2021 |
| WO | 2021/059753 | A1 | 4/2021 |
| WO | 2022/181225 | A1 | 9/2022 |
| WO | 2022/181231 | A1 | 9/2022 |
| WO | 2022/181232 | A1 | 9/2022 |

OTHER PUBLICATIONS

International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al, "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
Extended European Search Report issued Aug. 2, 2023 in European Application No. 20857704.9.
International Preliminary Report on Patentability dated Aug. 29, 2023 with a Translation of the Written Opinion of the International Searching Authority in Application No. PCT/JP2022/003634.
International Preliminary Report on Patentability dated Aug. 29, 2023 with a Translation of the Written Opinion of the International Searching Authority in Application No. PCT/JP2022/003635.
International Preliminary Report on Patentability dated Aug. 29, 2023 with a Translation of the Written Opinion of the International Searching Authority in Application No. PCT/JP2022/003636.
International Preliminary Report on Patentability dated Aug. 29, 2023 with a Translation of the Written Opinion of the International Searching Authority in Application No. PCT/JP2022/003637.
International Preliminary Report on Patentability dated Aug. 29, 2023 with a Translation of the Written Opinion of the International Searching Authority in Application No. PCT/JP2022/003638.
International Preliminary Report on Patentability dated Aug. 29, 2023 with a Translation of the Written Opinion of the International Searching Authority in Application No. PCT/JP2022/003640.

(56) References Cited

OTHER PUBLICATIONS

International Preliminary Report on Patentability dated Aug. 29, 2023 with a Translation of the Written Opinion of the International Searching Authority in Application No. PCT/JP2022/003641.
International Preliminary Report on Patentability dated Aug. 29, 2023 with a Translation of the Written Opinion of the International Searching Authority in Application No. PCT/JP2022/003642.
International Preliminary Report on Patentability dated Aug. 29, 2023 with a Translation of the Written Opinion of the International Searching Authority in Application No. PCT/JP2022/003643.
International Preliminary Report on Patentability dated Aug. 29, 2023 with a Translation of the Written Opinion of the International Searching Authority in Application No. PCT/JP2022/003644.
International Preliminary Report on Patentability dated Aug. 29, 2023 with a Translation of the Written Opinion of the International Searching Authority in Application No. PCT/JP2022/003645.
International Preliminary Report on Patentability dated Aug. 29, 2023 with a Translation of the Written Opinion of the International Searching Authority in Application No. PCT/JP2022/003646.
International Preliminary Report on Patentability dated Aug. 29, 2023 with a Translation of the Written Opinion of the International Searching Authority in Application No. PCT/JP2022/003647.
International Preliminary Report on Patentability dated Aug. 29, 2023 with a Translation of the Written Opinion of the International Searching Authority in Application No. PCT/JP2022/003648.
International Preliminary Report on Patentability dated Aug. 29, 2023 with a Translation of the Written Opinion of the International Searching Authority in Application No. PCT/JP2022/003649.
International Preliminary Report on Patentability dated Aug. 29, 2023 with a Translation of the Written Opinion of the International Searching Authority in Application No. PCT/JP2022/003650.
International Preliminary Report on Patentability dated Aug. 29, 2023 with a Translation of the Written Opinion of the International Searching Authority in Application No. PCT/JP2022/003651.
International Preliminary Report on Patentability dated Aug. 29, 2023 with a Translation of the Written Opinion of the International Searching Authority in Application No. PCT/JP2022/003652.
International Preliminary Report on Patentability dated Aug. 29, 2023 with a Translation of the Written Opinion of the International Searching Authority in Application No. PCT/JP2022/003653.
International Preliminary Report on Patentability dated Aug. 29, 2023 with a Translation of the Written Opinion of the International Searching Authority in Application No. PCT/JP2022/003654.
International Preliminary Report on Patentability dated Aug. 29, 2023 with a Translation of the Written Opinion of the International Searching Authority in Application No. PCT/JP2022/003657.
International Preliminary Report on Patentability dated Aug. 29, 2023 with a Translation of the Written Opinion of the International Searching Authority in Application No. PCT/JP2022/003658.
International Preliminary Report on Patentability dated Aug. 29, 2023 with a Translation of the Written Opinion of the International Searching Authority in Application No. PCT/JP2022/003659.
International Preliminary Report on Patentability dated Aug. 29, 2023 with a Translation of the Written Opinion of the International Searching Authority in Application No. PCT/JP2022/003660.
International Preliminary Report on Patentability dated Aug. 29, 2023 with a Translation of the Written Opinion of the International Searching Authority in Application No. PCT/JP2022/003661.
International Preliminary Report on Patentability dated Aug. 29, 2023 with a Translation of the Written Opinion of the International Searching Authority in Application No. PCT/JP2022/003664.
International Preliminary Report on Patentability dated Aug. 29, 2023 with a Translation of the Written Opinion of the International Searching Authority in Application No. PCT/JP2022/003665.
International Preliminary Report on Patentability dated Aug. 29, 2023 with a Translation of the Written Opinion of the International Searching Authority in Application No. PCT/JP2022/007735.
International Preliminary Report on Patentability dated Aug. 29, 2023 with a Translation of the Written Opinion of the International Searching Authority in Application No. PCT/JP2022/007737.
International Preliminary Report on Patentability dated Aug. 29, 2023 with a Translation of the Written Opinion of the International Searching Authority in Application No. PCT/JP2022/007738.
U.S. Appl. No. 17/679,789, filed Feb. 24, 2022, Isaka, et al., cont of PCT/JP2020/032238.
U.S. Appl. No. 17/679,831, filed Feb. 24, 2022, Isaka, et al., cont of PCT/JP2020/032239.
U.S. Appl. No. 17/679,818, filed Feb. 24, 2022, Isaka, et al., cont of PCT/JP2020/032236.
U.S. Appl. No. 17/679,765, filed Feb. 24, 2022, Isaka, et al., cont of PCT/JP2020/032237.
U.S. Appl. No. 17/680,911, filed Feb. 25, 2022, Tsuda, et al., cont of PCT/JP2020/032234.
U.S. Appl. No. 18/191,412, filed Mar. 28, 2023, Isaka, et al., cont of PCT/JP2021/036301.
U.S. Appl. No. 18/191,461, filed Mar. 28, 2023, Zenke, et al., cont of PCT/JP2021/036302.
U.S. Appl. No. 18/192,020, filed Mar. 29, 2023, Isaka, et al., cont of PCT/JP2021/036303.
U.S. Appl. No. 18/192,053, filed Mar. 29, 2023, Isaka, et al., cont of PCT/JP2021/036304.
U.S. Appl. No. 18/192,101, filed Mar. 29, 2023, Yamamoto, et al., cont of PCT/JP2021/036305.
U.S. Appl. No. 18/191,996, filed Mar. 29, 2023, Tsuda, et al., cont of PCT/JP2021/036306.
U.S. Appl. No. 18/192,052, filed Mar. 29, 2023, Zenke, et al., cont of PCT/JP2021/036307.
U.S. Appl. No. 18/192,011, filed Mar. 29, 2023, Isaka, et al., cont of PCT/JP2021/036308.
U.S. Appl. No. 18/192,298, filed Mar. 29, 2023, Isaka, et al., cont of PCT/JP2021/036310.
U.S. Appl. No. 18/453,775, filed Aug. 22, 2023, Tsuda, et al., cont of PCT/JP2022/007735.
U.S. Appl. No. 18/453,690, filed Aug. 22, 2023, Tsuda, et al., cont of PCT/JP2022/007737.
U.S. Appl. No. 18/452,806, filed Aug. 21, 2023, Tsuda, et al., cont of PCT/JP2022/007738.
U.S. Appl. No. 18/450,642, filed Aug. 16, 2023, Isaka, et al., cont of PCT/JP2022/003634.
U.S. Appl. No. 18/448,291, filed Aug. 11, 2023, Isaka, et al., cont of PCT/JP2022/003635.
U.S. Appl. No. 18/449,061, filed Aug. 14, 2023, Isaka, et al., cont of PCT/JP2022/003636.
U.S. Appl. No. 18/448,234, filed Aug. 11, 2023, Isaka, et al., cont of PCT/JP2022/003637.
U.S. Appl. No. 18/453,363, filed Aug. 22, 2023, Isaka, et al., cont of PCT/JP2022/003638.
U.S. Appl. No. 18/449,788, filed Aug. 15, 2023, Isaka, et al., cont of PCT/JP2022/003640.
U.S. Appl. No. 18/451,502, filed Aug. 17, 2023, Isaka, et al., cont of PCT/JP2022/003641.
U.S. Appl. No. 18/450,590, filed Aug. 16, 2023, Tsuda, et al., cont of PCT/JP2022/003642.
U.S. Appl. No. 18/450,094, filed Aug. 15, 2023, Hamada, et al., cont of PCT/JP2022/003643.
U.S. Appl. No. 18/449,845, filed Aug. 15, 2023, Zenke, et al., cont of PCT/JP2022/003644.
U.S. Appl. No. 18/446,746, filed Aug. 9, 2023, Isaka, et al., cont of PCT/JP2022/003645.
U.S. Appl. No. 18/450,491, filed Aug. 16, 2023, Isaka, et al., cont of PCT/JP2022/003646.
U.S. Appl. No. 18/451,525, filed Aug. 17, 2023, Isaka, et al., cont of PCT/JP2022/003647.
U.S. Appl. No. 18/451,455, filed Aug. 17, 2023, Isaka, et al., cont of PCT/JP2022/003468.
U.S. Appl. No. 18/452,107, filed Aug. 18, 2023, Isaka, et al., cont of PCT/JP2022/003649.
U.S. Appl. No. 18/452,146, filed Aug. 18, 2023, Isaka, et al., cont of PCT/JP2022/003650.
U.S. Appl. No. 18/448,341, filed Aug. 11, 2023, Isaka, et al., cont of PCT/JP2022/003651.
U.S. Appl. No. 18/449,778, filed Aug. 15, 2023, Isaka, et al., cont of PCT/JP2022/003652.

(56) References Cited

OTHER PUBLICATIONS

U.S. Appl. No. 18/447,877, filed Aug. 10, 2023, Isaka, et al., cont of PCT/JP2022/003653.
U.S. Appl. No. 18/452,908, filed Aug. 21, 2023, Isaka, et al., cont of PCT/JP2022/003654.
U.S. Appl. No. 18/454,141, filed Aug. 23, 2023, Isaka, et al., cont of PCT/JP2022/003657.
U.S. Appl. No. 18/453,709, filed Aug. 22, 2023, Isaka, et al., cont of PCT/JP2022/003658.
U.S. Appl. No. 18/452,769, filed Aug. 21, 2023, Isaka, et al., cont of PCT/JP2022/003659.
U.S. Appl. No. 18/453,810, filed Aug. 22, 2023, Tsuda, et al., cont of PCT/JP2022/003660.
U.S. Appl. No. 18/450,568, filed Aug. 16, 2023, Hamada, et al., cont of PCT/JP2022/003661.
U.S. Appl. No. 18/453,683, filed Aug. 22, 2023, Isaka, et al., cont of PCT/JP2022/003664.
U.S. Appl. No. 18/454,133, filed Aug. 23, 2023, Isaka, et al., cont of PCT/JP2022/003665.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
International Search Report dated Jun. 20, 2023 in International Application No. PCT/JP2023/013284.
International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.
International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Feb. 10, 2025 for European Patent Application No. 22759283.9.
European Search Report issued Feb. 20, 2025 for European Patent Application No. 22759263.1.
International Search Report issued Oct. 13, 2020 in International Application No. PCT/JP2020/032236.
International Search Report issued Oct. 13, 2020 in International Application No. PCT/JP2020/032237.
International Search Report issued Oct. 13, 2020 in International Application No. PCT/JP2020/032238.
International Search Report issued Oct. 13, 2020 in International Application No. PCT/JP2020/032239.
International Search Report dated Oct. 6, 2020 in International Application No. PCT/JP2020/032234.
International Preliminary Report on Patentability with Written Opinion dated Mar. 1, 2022 in International Application No. PCT/JP2020/032238.
International Preliminary Report on Patentability with Written Opinion dated Mar. 1, 2022 in International Application No. PCT/JP2020/032239.
International Preliminary Report on Patentability with Written Opinion dated Mar. 1, 2022 in International Application No. PCT/JP2020/032236.
International Preliminary Report on Patentability, with Translation of Written Opinion issued Mar. 1, 2022 in International Application No. PCT/JP2020/032237.

(56) References Cited

OTHER PUBLICATIONS

International Preliminary Report on Patentability with Written Opinion dated Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 9, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.
Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
U.S. Appl. No. 17/679,818, filed Feb. 22, 2022, Isaka et al, cont of PCT/JP2020/032236.
U.S. Appl. No. 18/192,101, filed Mar. 29, 2023, Yamamoto et al, cont of PCT/2021/036305.
U.S. Appl. No. 18/192,077, filed Mar. 29, 2023, Isaka et al, cont of PCT/JP2021/036309.
U.S. Appl. No. 18/192,298, filed Mar. 29, 2029, Isaka et al, cont of PCT/JP2021/036310.
Extended European Search Report dated Mar. 11, 2026 in application No. 23 780 928.0.
Extended European Search Report dated Mar. 11, 2026 in application No. 23 780 929.8.
Extended European Search Report dated Mar. 11, 2026 in application No. 23 780 936.3.
Extended European Search Report dated Mar. 11, 2026 in application No. 23 780 953.8.
Extended European Search Report dated Mar. 11, 2026 in application No. 23 780 954.6.
Extended European Search Report dated Mar. 11, 2026 in application No. 23 780 955.3.
Extended European Search Report dated Mar. 11, 2026 in application No. 23 780 932.2.
Extended European Search Report dated Mar. 11, 2026 in application No. 23 780 933.0.
Extended European Search Report dated Mar. 11, 2026 in application No. 23 780 934.8.

* cited by examiner

SEALING MEMBER AND POWER STORAGE BODY

CROSS-REFERENCE TO RELATED APPLICATIONS

This application is a Rule 53(b) Continuation of International Application No. PCT/JP2021/036309 filed Sep. 30, 2021, which claims priority based on Japanese Patent Application No. 2020-166536 filed Sep. 30, 2020, the respective disclosures of which are incorporated herein by reference in their entirety.

TECHNICAL FIELD

The present disclosure relates to a sealing member and power storage assembly.

BACKGROUND ART

Power storage assemblies such as non-aqueous electrolyte secondary batteries are mounted in a wide range of electronic and electrical devices.

Patent Literature 1 suggests a flat non-aqueous electrolyte secondary battery comprising a positive electrode, a negative electrode, a separator, and a non-aqueous electrolyte housed in a battery container comprising a battery case, a sealing plate, and a gasket, the material of the gasket comprising a tetrafluoroethylene-perfluoroalkyl vinyl ether copolymer (PFA resin) having a fluorine content of 70 mol % or higher and 85 mol % or lower and a melt flow rate (MFR) of 20 g/10 min or higher and 45 g/10 min or lower.

RELATED ART

Patent Literature

Patent Literature 1: Japanese Patent Laid-Open No. 2010-056079

SUMMARY

According to the present disclosure, there is provided a sealing member containing a copolymer containing tetrafluoroethylene unit and a perfluoro(propyl vinyl ether) unit, wherein the copolymer has a content of the perfluoro (propyl vinyl ether) unit of 4.0 to 6.0% by mass with respect to the whole of the monomer units and a melt flow rate of 26 to 37 g/10 min.

Effects

According to the present disclosure, an object thereof is to provide a sealing member that can be easily produced by an injection molding method, exhibits excellent sealability even at high temperatures, further maintains excellent sealability at high temperatures for a long period as well as enables to suppress the permeation of moisture in a higher level than that of conventional techniques, and also enables to suppress the intrusion of moisture in a high level even at high temperatures.

DESCRIPTION OF EMBODIMENTS

Figure 1:
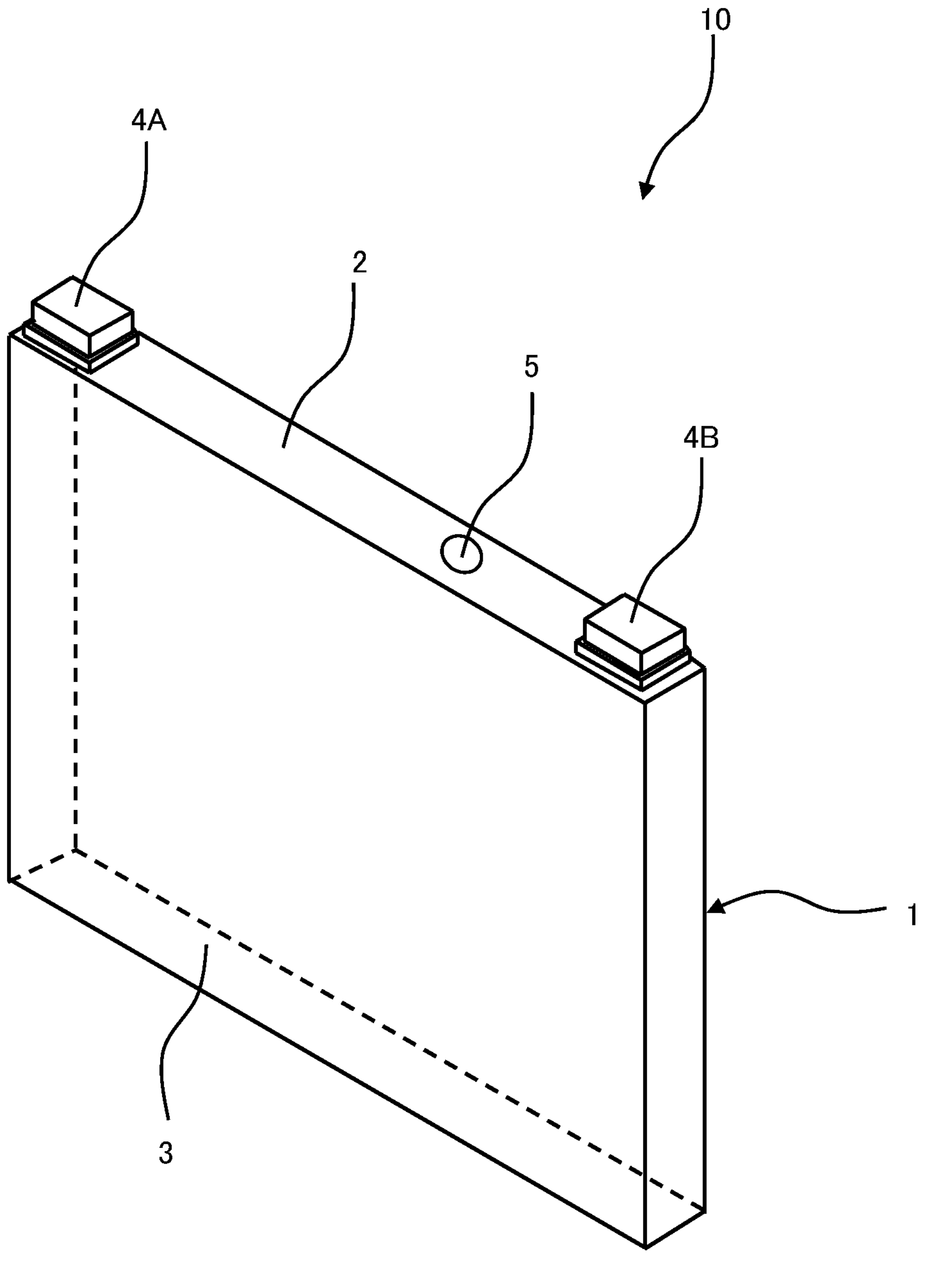
FIG. 1 is an external perspective view of a power storage assembly.

Hereinafter, specific embodiments of the present disclosure will be described in detail, but the present disclosure is not limited to the following embodiments.

A sealing member of the present disclosure contains a copolymer containing tetrafluoroethylene (TFE) unit and a perfluoro (propyl vinyl ether) (PPVE) unit.

In the description of Patent Literature 1, inexpensive mass-production of flat non-aqueous electrolyte secondary batteries maintaining high reliability for storage under severe environments such as a high temperature environment or high humidity environment and having achieved a further higher energy density is a critical issue in order to increase the demand on batteries of this type. In Patent Literature 1, for resolving this issue, a tetrafluoroethylene-perfluoroalkyl vinyl ether copolymer (PFA resin) having a fluorine content of 70 mol % or higher and 85 mol % or lower and a melt flow rate (MFR) of 20 g/10 min or higher and 45 g/10 min or lower is used as a material for gaskets.

However, the life of a power storage assembly has been lengthened in recently years. Thus, when moisture merely permeates gradually the gasket to intrude into the power storage assembly, this may cause deterioration of the power storage performance. Accordingly, there is a demand for a technique that enables to suppress the permeation of moisture in a higher level than the technique described in Patent Literature 1. Further, since power storage assemblies have been frequently used under an environment where the temperature becomes high, it is necessary to suppress the intrusion of moisture into power storage assemblies even at high temperatures. In Patent Literature 1, the discharge capacity and the presence or absence of leakage have been confirmed at 70° C., but there is a demand for a technique that can prevent moisture from intruding even at further high temperatures.

It has been found that sealing a power storage assembly by using a sealing member containing a copolymer which contains TFE unit and PPVE unit and in which the content of the PPVE unit and the melt flow rate (MFR) are suitably controlled enables to suppress the permeation of moisture in a higher level than that of conventional techniques and enables to suppress the intrusion of moisture in a high level even at high temperatures (e.g., 95° C.). Further, it has also been found that the sealing member containing such a copolymer exhibits excellent sealability over a long period even at high temperatures (e.g., 65° C.) and thus the sealing property does not deteriorate over a long period by using such a sealing member for sealing a power storage assembly even in the case where the power storage assembly abnormally generates heat and the temperature becomes high. In addition, such a sealing member can be easily produced by an injection molding method, and the surface of a sealing member provided by an injection molding method is very smooth.

The sealing member of the present disclosure has been completed based on these findings, can be easily produced by an injection molding method, exhibits excellent sealability even at high temperatures, further maintains excellent sealability at high temperatures for a long period as well as enables to suppress the permeation of moisture in a higher level than that of conventional techniques, and also enables to suppress the intrusion of moisture in a high level even at high temperatures.

The copolymer contained in the sealing member of the present disclosure is a melt-fabricable fluororesin. The melt-fabricability means that a polymer can be melted and processed by using conventional processing devices such as an extruder or an injection molding machine.

The content of the PPVE unit of the copolymer is 4.0 to 6.0% by mass with respect to the whole of the monomer units. The content of the PPVE unit of the copolymer is preferably 5.8% by mass or lower, more preferably 5.7% by mass or lower, further preferably 5.6% by mass, especially preferably 5.5% by mass or lower, preferably 4.1% by mass or higher, more preferably 4.2% by mass or higher, further preferably 4.3% by mass or higher, especially preferably 4.4% by mass or higher, and most preferably 4.5% by mass or higher. The copolymer satisfying the above range regarding the PPVE unit content can provide a sealing member that exhibits excellent sealability even at high temperatures, further maintains excellent sealability at high temperatures for a long period as well as enables to suppress the permeation of moisture in a higher level than that of conventional techniques, and also enables to suppress the intrusion of moisture in a high level even at high temperatures.

The content of tetrafluoroethylene (TFE) unit of the copolymer is preferably 94.0 to 96.0% by mass with respect to the whole of the monomer units. The content of TFE unit of the copolymer is more preferably 94.2% by mass or higher, further preferably 94.3% by mass or higher, even further preferably 94.4% by mass or higher, especially preferably 94.5% by mass or higher, more preferably 95.9% by mass or lower, further preferably 95.8% by mass or lower, even further preferably 95.7% by mass or lower, especially preferably 95.6% by mass or lower, and most preferably 95.5% by mass or lower. The copolymer satisfying the above range regarding TFE unit content can provide a sealing member that exhibits excellent sealability even at high temperatures, further maintains excellent sealability at high temperatures for a long period as well as enables to suppress the permeation of moisture in a higher level than that of conventional techniques, and also enables to suppress the intrusion of moisture in a high level even at high temperatures.

In the present disclosure, the content of each monomer unit in the copolymer can be measured by a $^{19}$F-NMR method.

The copolymer may also contain monomer units derived from monomers copolymerizable with TFE and PPVE. In this case, the content of the monomer units copolymerizable with TFE and PPVE is, with respect to the whole of the monomer units of the copolymer, preferably 0 to 2.0% by mass, more preferably 0.05 to 1.5% by mass and still more preferably 0.1 to 0.5% by mass.

The monomers copolymerizable with TFE and PPVE may include hexafluoropropylene (HFP), vinyl monomers represented by $CZ^1Z^2{=}CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2{=}CF{-}OCH_2{-}Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the PPVE unit, and TFE/HFP/PPVE copolymer, and is more preferably a copolymer consisting only of the TFE unit and the PPVE unit.

The fluorine content of the copolymer is preferably less than 70 mol %, more preferably 69 mol % or lower, further preferably 68 mol % or lower, especially preferably 67 mol % or lower, preferably 65 mol % or higher, and more preferably 66 mol % or higher. The copolymer satisfying the above range regarding the fluorine content can provide a sealing member that can be further easily produced by an injection molding method, exhibits further excellent sealability even at high temperatures, further maintains excellent sealability at high temperatures for a longer period as well as enables to suppress the permeation of moisture in a much higher level than that of conventional techniques, and also enables to suppress the intrusion of moisture in a much higher level even at high temperatures.

The fluorine content of the copolymer can be determined by calculation from the composition of the monomer units of the copolymer.

The melt flow rate (MFR) of the copolymer is 26 to 37 g/10 min. The MFR of the copolymer is preferably 28 g/10 min or higher, preferably 36 g/10 min or lower, more preferably 35 g/min or lower, and further preferably 34 g/10 min or lower. The copolymer satisfying the above range regarding the MFR can provide a sealing member that can be easily produced by an injection molding method, exhibits excellent sealability even at high temperatures, further maintains excellent sealability at high temperatures for a long period as well as enables to suppress the permeation of moisture in a higher level than that of conventional techniques, and also enables to suppress the intrusion of moisture in a high level even at high temperatures.

In the present disclosure, the melt flow rate of the copolymer is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be controlled by controlling the type and amount of the polymerization initiator for use in polymerization of monomers, the type and amount of the chain transfer agent, and the like.

The number of functional groups per $10^6$ main-chain carbon atoms of the copolymer is usually more than 50, preferably 75 or more, more preferably 100 or more, further preferably 150 or more; the upper limit is not limited, but may be 800 or less. Controlling the content of PPVE unit and the melt flow rate (MFR) of the copolymer as well as introducing a sufficient number of functional groups into the copolymer can further improve the permeation of carbon dioxide through the sealing member obtained from the copolymer. Further, a copolymer having the number of functional groups within the above range is easily produced and can be produced at a low cost. Accordingly, use of a sealing member containing the copolymer having a sufficient number of functional groups in the power storage assembly enables the cost of a power storage assembly to be reduced as well as can provide a power storage assembly inside which carbon dioxide generated is unlikely to reside. Even in the case where the number of functional groups of the copolymer is large, a sealing member that enables to suppress the permeation of moisture in a higher level than that of conventional techniques can be provided by suitably controlling the content of the PPVE unit and the MFR. Accordingly, by using a sealing member containing the copolymer having a sufficient number of functional groups, carbon dioxide that may be generated during battery use can be allowed to permeate out of the power storage assembly and the power storage assembly can be sufficiently sealed while expansion of the power storage assembly is suppressed.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.3 mm in thickness. The film is analyzed by Fourier transform infrared spectroscopy to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the copolymer is calculated according to the following formula (A).

$$N=I\times K/t \quad \text{(A)}$$

I: absorbance

K: correction factor t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

Absorption frequencies of —$CH_2CF_2H$, —$CH_2COF$, —$CH_2COOH$, —$CH_2COOCH_3$ and —$CH_2CONH_2$ are lower by a few tens of kaysers ($cm^{-1}$) than those of —$CF_2H$, —COF, —COOH free and —COOH bonded, —$COOCH_3$ and —$CONH_2$ shown in the Table, respectively.

For example, the number of the functional group —COF is the total of the number of a functional group determined from an absorption peak having an absorption frequency of 1,883 $cm^{-1}$ derived from —$CF_2COF$ and the number of a functional group determined from an absorption peak having an absorption frequency of 1,840 $cm^{-1}$ derived from —$CH_2COF$.

The functional groups are ones present on main chain terminals or side chain terminals of the copolymer, and ones present in the main chain or the side chains. The number of the functional groups may be the total of numbers of —$CF{=}CF_2$, —$CF_2H$, —COF, —COOH, —$COOCH_3$, —$CONH_2$ and —$CH_2OH$.

The functional groups are introduced to the copolymer by, for example, a chain transfer agent or a polymerization initiator used for production of the copolymer. For example, in the case of using an alcohol as the chain transfer agent, or a peroxide having a structure of —$CH_2OH$ as the polymerization initiator, —$CH_2OH$ is introduced on the main chain terminals of the copolymer. Alternatively, the functional group is introduced on the side chain terminal of the copolymer by polymerizing a monomer having the functional group.

Subjecting the copolymer having the above functional group to a fluorination treatment causes the number of functional groups to be reduced. That is, the copolymer is preferably one which has not been subjected to the fluorination treatment. The copolymer is also preferably one which has not been subjected to stabilization treatment, such as ammonia treatment.

The melting point of the copolymer is preferably 301 to 317° C. and preferably 306° C. or lower. The copolymer satisfying the above range regarding the melting point can provide a sealing member that can be further easily produced by an injection molding method, exhibits excellent sealability even at high temperatures as well as enables to suppress the permeation of moisture in a higher level than that of conventional techniques, and also enables to suppress the intrusion of moisture in a high level even at high temperatures.

In the present disclosure, the melting point can be measured by using a differential scanning calorimeter [DSC].

The quantity of heat of melting of the copolymer of the present disclosure, as measured by differential scanning calorimetry, is preferably 24.0 mJ/mg or higher, more preferably 25.0 mJ/mg or higher, further preferably 28.0 mJ/mg or higher, preferably 40.0 mJ/mg or lower, and more preferably 38.0 mJ/mg or lower. The copolymer satisfying the above range regarding the quantity of heat of melting can provide a sealing member that can be further easily produced by an injection molding method, exhibits excellent sealability even at high temperatures as well as enables to suppress the permeation of moisture in a higher level than that of conventional techniques, and also enables to suppress the intrusion of moisture in a high level even at high temperatures.

The water vapor permeability of the copolymer is preferably 11.5 $g\cdot cm/m^2$ or lower and more preferably 10.5 $g\cdot cm/m^2$ or lower. The copolymer satisfying the above range regarding the water vapor permeability can provide a sealing member that enables to suppress the permeation of moisture in a higher level than that of conventional techniques, and use of such a sealing member enables to provide the power storage assembly in which the permeation of moisture from the outside is suppressed in a high level. The water vapor permeability of the copolymer can be reduced by controlling the content of the PPVE unit and the MFR of the copolymer.

The water vapor permeability of the copolymer can be identified by using a film of the copolymer and measuring the mass of water vapor permeating the film under the condition of a temperature of 95° C. and 30 days. It can be said that the smaller this value, in the case where the copolymer is formed into a sealing member, the more the water vapor that penetrates and diffuses inside the object of the sealing member to permeate therethrough can be reduced and thus the water vapor that permeates through the sealing member from the surface exposed outside toward the surface exposed inside can be suppressed. Accordingly, use of the sealing member containing a copolymer having a low water vapor permeability enables to provide a power storage assembly in which the permeation of moisture is suppressed in a high level.

The amount of water vapor leakage of the copolymer is preferably 0.0035 g/1,000 h or smaller and more preferably 0.0033 g/1,000 h or smaller; and the lower limit is not limited, but may be 0.0015 g/1,000 h or larger. The copolymer satisfying the above range regarding the amount of water vapor leakage enables to provide a sealing member that enables to suppress the intrusion of moisture in a much higher level at high temperatures, and use of such a sealing member enables to provide a power storage assembly in which the intrusion of moisture is further suppressed. The amount of water vapor leakage of the copolymer can be reduced by controlling the content of PPVE unit and the MFR of the copolymer.

The amount of water vapor leakage of the copolymer can be determined by measuring the reduced mass of water inside a space sealed by providing a gasket (outer diameter: 17.7 mm, inner diameter: 14.3 mm, thickness: 1.6 mmt) under the condition of 95° C. and 1,000 hours, where the gasket used is obtained by injection molding the copolymer. The amount of water vapor leakage of the copolymer, in the case where the copolymer is formed into a gasket, is the total of the amount of water vapor permeation that permeates through the gasket in the face direction and the amount of water vapor that passes through the contacting face between the gasket and the power storage assembly constituting members. It can be said that the smaller this value, the more the intrusion of moisture from the face direction in the case where the copolymer formed into a gasket can be suppressed. Accordingly, use of the gasket containing the copolymer of which the amount of water vapor leakage at 95° C. is small enables to provide a sealing member that enables to suppress the intrusion of moisture in a much higher level at high temperatures to thereby enable to provide a power storage assembly into which the intrusion of moisture is suppressed in a high level even at high temperatures.

The storage elastic modulus (E') at 150° C. of the copolymer is preferably 10 MPa or higher and more preferably 50 MPa or higher, and preferably 1,000 MPa or lower, more preferably 500 MPa or lower and still more preferably 200 MPa or lower. The copolymer satisfying the above range regarding the storage elastic modulus (E') at 150° C. can provide a sealing member that can exhibit excellent sealability at high temperatures, and use of such a sealing member enables to provide a power storage assembly having a sealing property which can be much less deteriorated even in the case where the temperature becomes abnormally high.

The storage elastic modulus (E') can be measured by carrying out a dynamic viscoelasticity measurement under the condition of a temperature-increasing rate of 2° C./min and a frequency of 10 Hz and in the range of 30 to 250° C.

The surface pressure at 150° C. of the copolymer is preferably 0.20 MPa or higher, more preferably 0.25 MPa or higher; the upper limit is not limited, but may be 2.5 MPa or lower. The sealing member containing the copolymer having high surface pressure at 150° C. can exhibit excellent sealability at high temperatures. Therefore, use of a sealing member containing such a copolymer enables to provide the power storage assembly having a sealing property which can be much less deteriorated even in the case where the temperature becomes abnormally high. The surface pressure at 150° C. of the copolymer can be raised by controlling the content of the PPVE unit and the melt flow rate (MFR) of the copolymer.

The surface pressure can be determined as follows. A test piece is deformed at a compression deformation rate of 50%, allowed to stand as is at 150° C. for 18 hours, released from the compressive state and allowed to stand at room temperature for 30 min, and thereafter, the height of the test piece (height of the test piece after being compressively deformed) is measured; and the surface pressure can be calculated by the following formula using the height of the test piece after being compressively deformed, and the storage elastic modulus (MPa) at 150° C.

$$\text{surface pressure at } 150^\circ \text{ C. (MPa)}=(t_2-t_1)/t_1\times E'$$

- $t_1$: an original height (mm) of a test piece before being compressively deformed×50%
- $t_2$: a height (mm) of the test piece after being compressively deformed
- E': a storage elastic modulus (MPa) at 150° C.

The carbon dioxide permeation coefficient of the copolymer is preferably 1, 515 $cm^3$·mm/($m^2$·24 h·atm) or higher and more preferably 1, 565 $cm^3$·mm/($m^2$·24 h·atm) or higher. It has been found that controlling the content of PPVE unit and the melt flow rate (MFR) of the copolymer as well as introducing a relatively large number of functional groups into the copolymer enables to provide a copolymer having a relatively high carbon dioxide permeation coefficient. Accordingly, the sealing member containing such a copolymer allows carbon dioxide to permeate easily, and use of such a sealing member enables to provide a power storage assembly inside which carbon dioxide is unlikely to reside.

In the present disclosure, the carbon dioxide permeation coefficient can be measured under the condition of a test temperature of 70° C. and a test humidity of 0% RH. Specific measurement of the carbon dioxide permeation coefficient can be conducted by the method described in Examples.

The copolymer for forming the sealing member of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:

- dialkyl peroxycarbonates such as di-n-propyl peroxydicarbonate, diisopropyl peroxydicarbonate, di-sec-butyl peroxydicarbonate and di-2-ethoxyethyl peroxydicarbonate;
- peroxyesters such as t-butyl peroxyisobutyrate and t-butyl peroxypivalate;
- dialkyl peroxides such as di-t-butyl peroxide; and
- di[fluoro (or fluorochloro)acyl] peroxides.

The di[fluoro (or fluorochloro)acyl] peroxides include diacyl peroxides represented by $[(RfCOO)—]_2$ wherein Rf is a perfluoroalkyl group, an ω-hydroperfluoroalkyl group or a fluorochloroalkyl group.

Examples of the di[fluoro(or fluorochloro)acyl] peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydrodo-decafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite or a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2CF_2H$ and $CF_3CF_2CF_2CF_2CF_2CF_2CF_2H$; hydrofluoroethers such as $CH_3OC_2F_5$, $CH_3OC_3FsCF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, $—COOCH_3$, $—CH_2OH$, —COF, $—CF—CF_2$ and $—CONH_2$, and thermally relatively stable functional groups thereof, such as $—CF_2H$, can be converted to thermally very stable $—CF_3$. Consequently, the total number (number of functional groups) of COOH, $—COOCH_3$, $—CH_2OH$, —COF, $—CF{=}CF_2$, $—CONH_2$ and $—CF_2H$ of the copolymer can be reduced.

The fluorine-containing compound is not limited, but includes fluorine radical sources generating fluorine radicals under the fluorination treatment condition. The fluorine radical sources include $F_2$ gas, $CoF_3$, $AgF_2$, $UF_6$, $OF_2$, $N_2F_2$, $CF_3OF$, halogen fluorides (for example, $IF_5$ and $ClF_3$).

The fluorine radical source such as $F_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas ($F_2$ gas).

The sealing member, as required, may contain other components. The other components may include fillers, plasticizers, pigments, colorants, antioxidants, ultraviolet absorbents, flame retarders, antiaging agents, antistatic agents and antibacterial agents.

As the other components, above all, fillers are preferred. Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber.

As described above, the sealing member can contain other components other than the copolymer. However, from the viewpoint of making the gasket to sufficiently exhibit excellent properties of the copolymer, the sealing member preferably contains less amounts of the other components, and most preferably contains no other components. Specifically, the amount of the other components is, with respect to the mass of the sealing member, preferably 30% by mass or lower, more preferably 10% by mass or lower and most preferably 0% by mass, that is, it is most preferable that the sealing member contains no other components. The gasket may be one consisting only of the copolymer.

The sealing member can be produced by molding the copolymer or a composition containing the copolymer and the other components into a desired shape and size. A method of producing the composition includes a method of dry mixing the copolymer and the other components, and a method of previously mixing the copolymer and the other components by a mixer and then melt kneading the mixture by a kneader, melt extruder or the like.

A method of molding the copolymer or the composition is not limited, and includes injection molding, extrusion forming, compression molding, blow molding and transfer molding. Among these, preferred are compression molding, injection molding or transfer molding; and injection molding or transfer molding are more preferred because the sealing member can be produced in a high productivity. That is, the sealing member is preferably an injection molded article or a transfer molded article, because the gasket can be produced in a high productivity.

The sealing member of the present disclosure can be used, for example, as a gasket or a packing. The sealing member of the present disclosure also can be suitably utilized as an insulating member such as an insulating gasket or an insulating packing. The sealing member is a member used to prevent leakage of liquid or gas or the intrusion of liquid or gas from the outside. The insulating member is a member used to insulate electricity.

The sealing member of the present disclosure can be suitably used as a sealing member to seal a power storage assembly. Then, a power storage assembly according to one embodiment of the present disclosure will be described by reference to the drawings.

A power storage assembly illustrated in FIG. 1 is a closed rectangular secondary battery. The power storage assembly 10 has an exterior can 1 and a lid 2. The exterior can 1 has an opening (not shown in figure) formed on the upper part facing the bottom face 3. The exterior can 1 is composed of, for example, aluminum, an aluminum alloy, stainless, or the like. The voltage of the power storage assembly 10 is 3.0 V or higher, for example.

In the exterior can 1, an electric element (not shown in figure) such as a power generator is housed, and the opening of the exterior can is hermetically sealed with the lid 2. The peripheral portion of the lid 2 is joined to the edge portion of the opening of the exterior can 1.

The lid 2 is provided with a liquid injection hole for injecting an electrolytic solution in the exterior can 1. The electrolytic solution may be one or two or more known solvents such as propylene carbonate, ethylene carbonate, butylene carbonate, γ-butyrolactone, 1,2-dimethoxyethane, 1,2-diethoxyethane, dimethyl carbonate, diethyl carbonate and ethyl methyl carbonate. Solutions can also be used in which an electrolyte is dissolved in an electrolytic solution. The electrolyte is not limited, but may be $LiClO_4$, $LiAsF_6$, $LiPF_6$, $LiBF_4$, LiCl, LiBr, $CH_3SO_3Li$, $CF_3SO_3Li$, cesium carbonate and the like.

After the electrolytic solution is injected through the liquid injection hole into the exterior can 1, the liquid injection hole is installed with a plug 5, and the plug 5 is jointed to the edge portion of the liquid injection hole of the lid 2. The joining can be carried out by welding using laser.

The lid 2 is installed with a first external terminal 4A and a second external terminal 4B; and an externally generated electric power is supplied through the first external terminal 4A and the second external terminal 4B to the electric element, and is stored in the power storage assembly; and then, the power is supplied to an external load. For example, the first external terminal 4A is a positive electrode terminal; and the second external terminal 4B is a negative electrode terminal. The first external terminal 4A is constituted, for example, of aluminum or an aluminum alloy. The second external terminal 4B is constituted, for example, of copper or a copper alloy.

Figure 2:
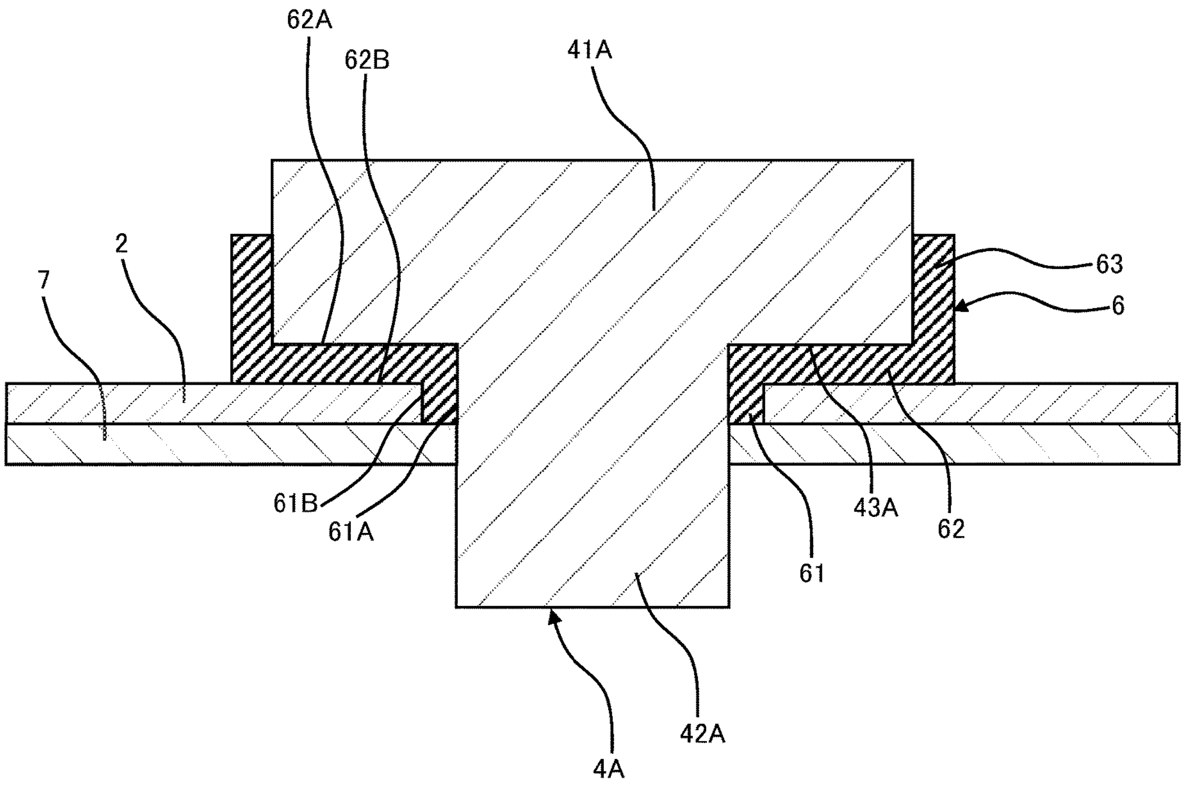
FIG. 2 is a schematic cross-sectional view illustrating a constitution of a terminal part of a power storage assembly.

In order to electrically insulate the first external terminal 4A and the second external terminal 4B from the lid 2, sealing members 6 and insulating members 7 are installed on the lid 2. FIG. 2 is a schematic cross-sectional view illustrating a constitution of a terminal part of a power storage assembly. Places are usually different where the first external terminal and the second external terminal are arranged on a constituting material or the lid 2, but since the other constitutions can be made identical, the following description will be made by way of an example of the first external terminal 4A.

As illustrated in FIG. 2, the first external terminal 4A has a terminal head part 41A having a rectangular parallelepiped block shape and a cylindrical shaft part 42A. The terminal head part 41A has an external profile of a rectangular lower face 43A; and the shaft part 42A protrudes from the lower face 43A of the terminal head part 41A.

As illustrated in FIG. 2, the sealing member 6 has a cylindrical part 61, a flange part 62 extending from one opening of the cylindrical part 61 in the radial direction, and a side wall part 63 rising from the periphery of the flange part 62.

The cylindrical part 61 is externally fitted on the shaft part 42A of the first external terminal 4A, and the contacting face 61A of the inner peripheral portion of the cylindrical part 61 makes contact with an outer peripheral face of the shaft part 42A. Then, the cylindrical part 61 is inserted in a through-hole of the lid 2, and the contacting face 61B of the outer peripheral portion of the cylindrical part 61 makes contact with the inner peripheral face of the through-hole of the lid 2.

The flange part 62 is held between the lid 2 and the first external terminal 4A, and the contacting face 62A of the flange part 62 makes contact with the lower face 43A of the first external terminal 4A. Further, the contacting face 62B of the flange part 62 makes contact with a front side of the lid 2. The flange part 62 may be held between the lid 2 and the external terminal 4A with an adhesive layer interposed therebetween, but in the power storage assembly 10, the flange part 62 is in a direct contact with the lid 2 and the external terminal 4A to secure the sealing property of the power storage assembly. In the power storage assembly 10, although the lower face 43A of the first external terminal 4A and the surface of the lid 2 are flat, the sealing property of the power storage assembly may be secured by providing one or both of the lower face 43A of the first external terminal 4A and the surface of the lid 2 with a projection, a step, or the like and holding the flange part 62 between the lid 2 and the external terminal 4A to make the compressibility of a portion of the flange part 62 higher than that of the other portion. Alternatively, in the power storage assembly 10, although each contacting face of the flange part 62 is flat, the sealing property of the power storage assembly may be secured by providing one or both of the contacting faces of the flange part 62 with a protruding portion and an inclination and holding the flange part 62 between the lid 2 and the external terminal 4A to make the compressibility of a portion of the flange part 62 higher than that of the other portion.

The sealing member 6 makes contact with the first external terminal 4A and the lid 2 in the state that the cylindrical part 61 and the flange part 62 of the sealing member 6 are compressed, and the sealing property of the power storage assembly can thereby be secured.

By suitably controlling the content of the PPVE unit and the melt flow rate (MFR) of the copolymer forming the sealing member 6, as well as suitably controlling the thickness of the sealing member 6, the sealing property of the power storage assembly can be further enhanced. The thickness of the sealing member is preferably 0.5 to 2.5 mm, more preferably 2.0 mm or smaller, further preferably 1.5 mm or smaller, especially preferably 1.2 mm or smaller, and most preferably 1.0 mm or smaller. A sealing member having a smaller thickness tends to reduce the amount of moisture that permeates through the sealing member. However, in the case where the thickness of the sealing member is too small, sufficient rebound resilience cannot be provided, and thus the amount of moisture leaking outside from the contacting face between the sealing member and the power storage assembly constituting members may not be sufficiently reduced. By suitably controlling the content of the PPVE unit and the melt flow rate (MFR) of the copolymer and suitably controlling the thickness of the sealing member, the amount of moisture permeating through the sealing member can be reduced, as well as the amount of moisture leaking outside from the contacting face between the sealing member and the power storage assembly constituting members can be reduced.

Figure 3:
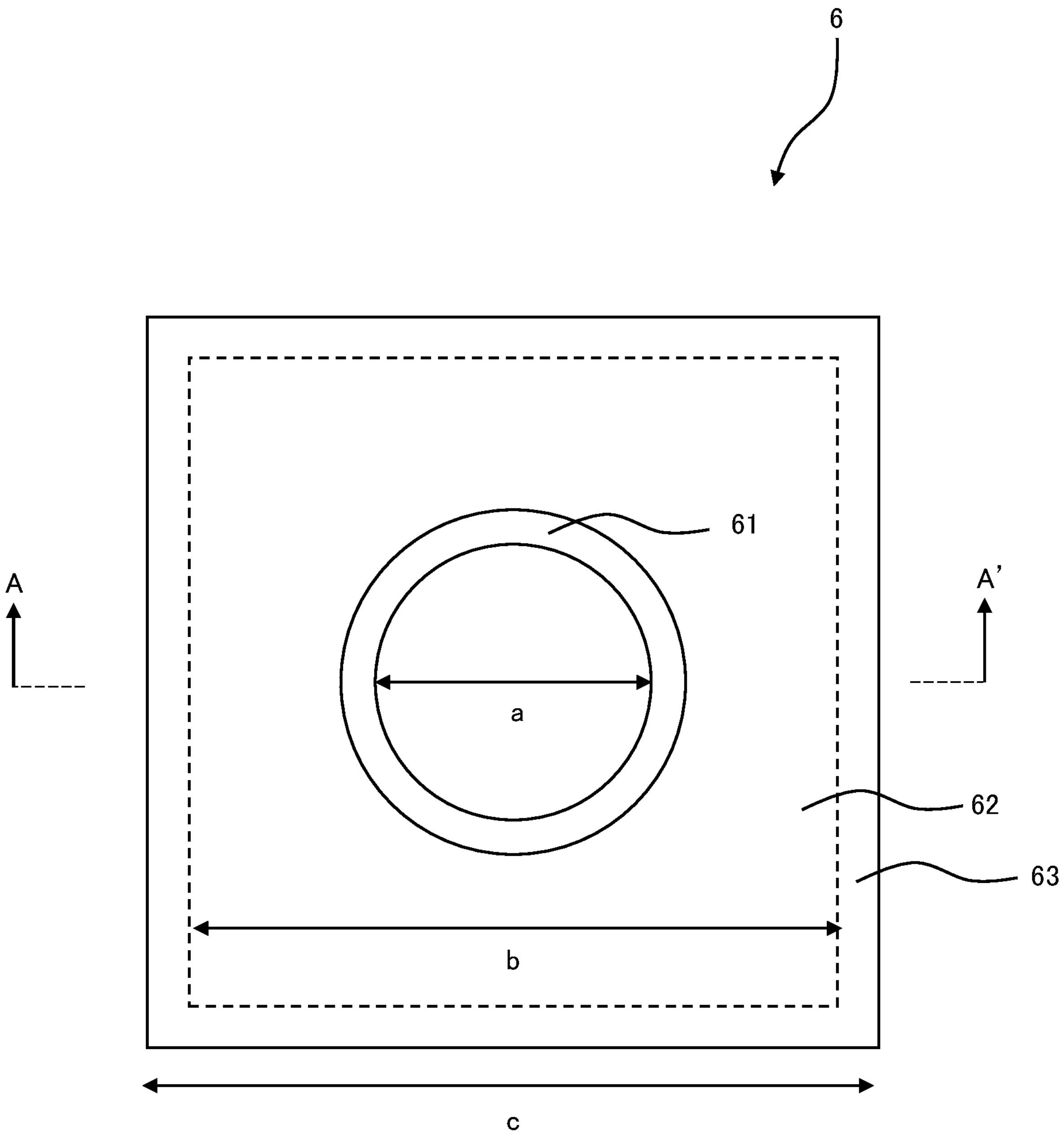
FIG. 3 is a front view of a sealing member.
Figure 4:
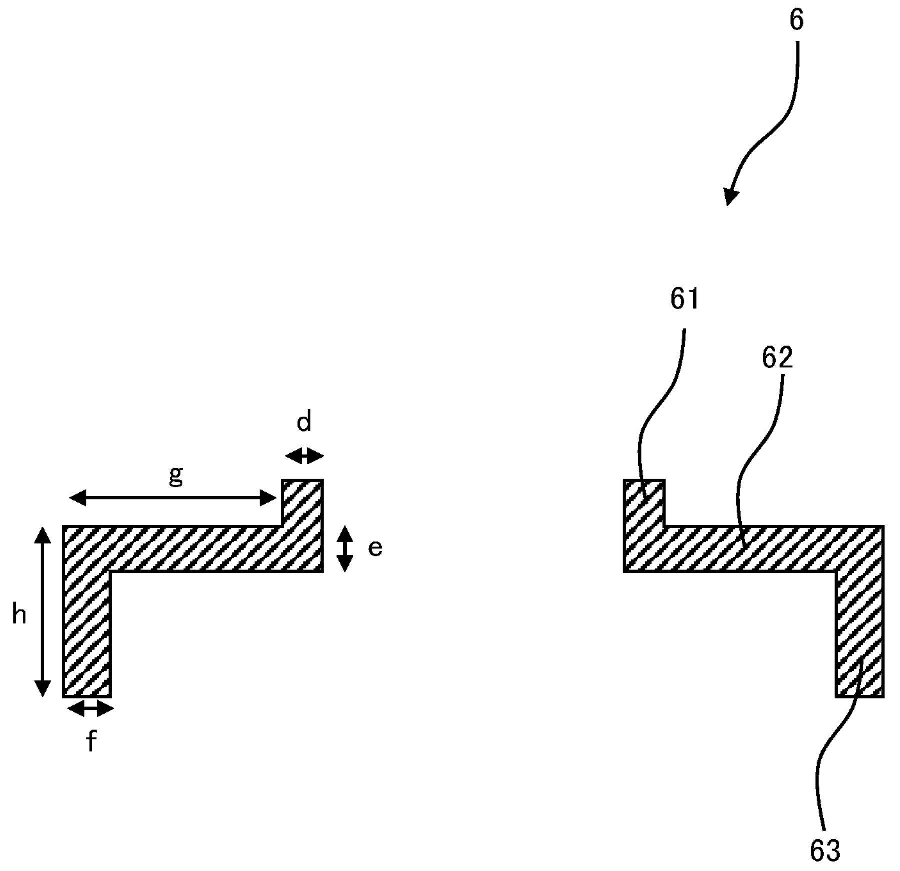
FIG. 4 is a cross-sectional view taken on line A-A' of FIG. 3.

FIG. 3 is a front view of the sealing member 6, and FIG. 4 is a cross-sectional view taken on line A-A' of the sealing member 6. In the present disclosure, the thickness of the sealing member refers to the thickness of parts contributing to the sealing property of the power storage assembly, and is, in the sealing member 6 illustrated in FIG. 4, thickness d and thickness e. The thickness d and the thickness e may be different from each other as in the sealing member illustrated in FIG. 4, or may be identical. In either the case of the thickness d and the thickness e being identical or the case of being different, it is preferable that the thicknesses of the both are suitably controlled. Then, in consideration of the productivity of the sealing member, since that variation in the thicknesses is preferably not large, the thicknesses of parts of the whole sealing member may be controlled in the above range. In the sealing member illustrated in FIG. 4, not only the thickness d and the thickness e, but also the thickness f is suitably controlled to fall in the above range.

By suitably controlling the content of the PPVE unit and the melt flow rate (MFR) of the copolymer to form the sealing member 6, as well as suitably controlling the sealing area of the sealing member 6, the sealing property of the power storage assembly can further be enhanced. The sealing area of the sealing member is preferably 0.5 to 50 $cm^2$, and the upper limit thereof is more preferably 35 $cm^2$, the upper limit thereof is still more preferably 20 $cm^2$, the upper limit thereof is especially preferably 10 $cm^2$, and the upper limit thereof is most preferably 5 $cm^2$; and the lower limit thereof is more preferably 1 $cm^2$ and the lower limit thereof is still more preferably 2 $cm^2$. A smaller sealing area of the sealing member gives a larger distance between the inside and the outside of the power storage assembly, and the intrusion of moisture can much more be suppressed, but since downsizing of the power storage assembly is demanded, the sealing area needs to be made small; however, it is difficult for conventional sealing members to reduce the sealing area and simultaneously sufficiently suppress the intrusion of moisture. The sealing member of the present disclosure enables to suppress the intrusion of moisture further more while achieving the downsizing of the power storage assembly by reducing the sealing area of the sealing member as mentioned above, since the copolymer is suitably controlled in terms of the content of the PPVE unit and the melt flow rate (MFR).

In the present disclosure, the sealing area of the sealing member is an area of portions contributing to the sealing property of the power storage assembly, and is, in the sealing member 6 illustrated in FIG. 2, a total area of the contacting faces 61A, 61B, 62A and 62B.

By suitably controlling the content of the PPVE unit and the melt flow rate (MFR) of the copolymer forming the sealing member 6, as well as suitably controlling the compression deformation rate of the sealing member, the sealing property of the power storage assembly can be further enhanced. The compression deformation rate of the sealing member is preferably 20 to 60%. The compression deformation rate of the sealing member can be calculated by the following formula.

Compression deformation rate (%)=[(a thickness of the sealing member before being compressed)−(a thickness of the sealing member in the compressed state)]/(the thickness of the sealing member before being compressed)×100

The maximum rebound resilience (contact pressure) of the sealing member when the sealing member is deformed at a compression deformation rate of 20 to 60% is preferably 10 MPa or higher. In the power storage assembly 10 illustrated in FIG. 1, for example, the flange part 62 of the sealing member 6 is deformed by the lid 2 and the first external terminal 4A at a compression deformation rate of 20 to 60%, and the contacting face 62A and contacting face 62B of the flange part 62 in the compressed state can exhibit a pressure of 10 MPa or higher at the maximum on the lower face 43A of the external terminal 4A and the surface of the lid 2, respectively.

In one embodiment, a sealing member illustrated in FIG. 3 and FIG. 4 has the following size.

a: 4.0 mm
b: 9.4 mm
c: 10.6 mm
d: 0.5 mm
e: 0.6 mm
f: 0.6 mm
g: 2.8 mm
h: 2.2 mm

In FIG. 1 and FIG. 2, a closed rectangular secondary battery has been described as the power storage assembly, but the power storage assembly of the present disclosure may be other types of power storage assembly. The power storage assembly may be, for example, a primary battery or may be, for example, a power storage battery (secondary battery) or a power storage element. The power storage assembly may also be a nonaqueous electrolyte battery. The nonaqueous electrolyte battery includes every battery having an electrolytic solution and an electric power generating element. Examples of the nonaqueous electrolyte battery include lithium ion primary batteries, lithium ion secondary batteries, nickel hydrogen batteries, lithium ion capacitors and electric double layer capacitors. These can be used as a vehicular power storage battery or as a stationary power storage battery.

So far, embodiments have been described, but it is to be understood that various changes and modifications of patterns and details may be made without departing from the subject matter and the scope of the claims.

According to the present disclosure, there is provided a sealing member containing a copolymer containing tetrafluoroethylene unit and a perfluoro(propyl vinyl ether) unit, wherein the copolymer has a content of the perfluoro (propyl vinyl ether) unit of 4.0 to 6.0% by mass with respect to the whole of the monomer units and a melt flow rate of 26 to 37 g/10 min.

The thickness of the sealing member of the present disclosure is preferably 0.5 to 2.5 mm.

The sealing area of the sealing member of the present disclosure is preferably 0.5 to 50 $cm^2$.

In the sealing member of the present disclosure, the melting point of the copolymer is preferably 301 to 317° C.

In the sealing member of the present disclosure, the quantity of heat of melting of the copolymer is preferably 24.0 mJ/mg or higher.

In the sealing member of the present disclosure, the fluorine content of the copolymer is preferably less than 70 mol %.

In the sealing member of the present disclosure, the number of functional groups of the copolymer is preferably more than 50 per $10^6$ main-chain carbon atoms.

The sealing member of the present disclosure is preferably an injection molded article or a transfer molded article.

According to the present disclosure, there is provided a power storage assembly comprising the sealing member described above.

The power storage assembly of the present disclosure preferably has an exterior can, an electric element housed in the exterior can, a lid to close an opening of the exterior can, and an external terminal installed on the lid, and the sealing member is held between the lid and the external terminal.

EXAMPLES

The embodiments of the present disclosure will be described by Experimental Examples as follows, but the present disclosure is not limited only to these Experimental Examples.

Each numerical value in Experimental Examples and Comparative Examples was measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Number of Functional Groups)

Pellets of the copolymer was molded by cold press into a film of 0.25 to 0.3 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1\times10^6$ carbon atoms in the sample was calculated according to the following formula (A).

$$N=I\times K/t \qquad (A)$$

I: absorbance

K: correction factor t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

TABLE 2

| Functional Group | Absorption Frequency ($cm^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —$COOCH_3$ | 1795 | 680 | 342 | $C_7F_{15}COOCH_3$ |
| —$CONH_2$ | 3436 | 506 | 460 | $C_7H_{15}CONH_2$ |
| —$CH_2OH_2$, —OH | 3648 | 104 | 2236 | $C_7H_{15}CH_2OH$ |
| —$CF_2H$ | 3020 | 8.8 | 26485 | $H(CF_2CF_2)_3CH_2OH$ |
| —$CF{=}CF_2$ | 1795 | 635 | 366 | $CF_2{=}CF_2$ |

(Melting Point (Second), Quantity of Heat of Melting (Second))

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); the melting point was determined from a melting curve peak observed in the second temperature raising step; and the quantity of heat of melting was determined from the area of the melting curve peak.

Experimental Example 1

49.0 L of pure water was charged in a 174 L-volume autoclave; nitrogen replacement was sufficiently carried out; thereafter, 40.7 kg of perfluorocyclobutane, 1.38 kg of perfluoro(propyl vinyl ether) (PPVE) and 4.00 kg of methanol were charged; and the temperature in the system was held at 35° C. and the stirring speed was held at 200 rpm. Then, tetrafluoroethylene (TFE) was introduced under pressure up to 0.64 MPa, and thereafter 0.041 kg of a 50% methanol solution of di-n-propyl peroxydicarbonate was charged to initiate polymerization. Since the pressure in the system decreased along with the progress of the polymerization, TFE was continuously supplied to make the pressure constant, and 0.047 kg of PPVE was added for every 1 kg of TFE supplied and the polymerization was continued for 18 hours. TFE was released to return the pressure in the autoclave to the atmospheric pressure, and thereafter, an obtained reaction product was washed with water and dried to thereby obtain 30 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the above physical properties were measured by the methods described above.

Experimental Example 2

Pellets were obtained as in Experimental Example 1, except for changing the charged amount of pure water to 34.0 L, perfluorocyclobutane to 30.4 kg, PPVE to 0.98 kg and methanol to 1.65 kg, introducing TFE under pressure to 0.60 MPa, changing the charged amount of the 50% methanol solution of di-n-propyl peroxydicarbonate to 0.060 kg, adding 0.052 kg of PPVE for every 1 kg of TFE supplied, and changing the polymerization time to 23 hours.

Experimental Example 3

Pellets were obtained as in Experimental Example 1, except for changing the charged amount of pure water to 49.0 L, perfluorocyclobutane to 40.7 kg, PPVE to 1.95 kg and methanol to 3.80 kg, introducing TFE under pressure to 0.64 MPa, changing the charged amount of the 50% methanol solution of di-n-propyl peroxydicarbonate to 0.041 kg, adding 0.058 kg of PPVE for every 1 kg of TFE supplied, and changing the polymerization time to 19 hours.

Experimental Example 4

51.8 L of pure water was charged in a 174 L-volume autoclave; nitrogen replacement was sufficiently carried out; thereafter, 40.9 kg of perfluorocyclobutane, 2.30 kg of perfluoro (propyl vinyl ether) (PPVE) and 2.38 kg of methanol were charged; and the temperature in the system was held at 35° C. and the stirring speed was held at 200 rpm. Then, tetrafluoroethylene (TFE) was introduced under pressure up to 0.64 MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.050 kg of PPVE was additionally charged for every 1 kg of TFE supplied. When the amount of TFE additionally charged reached 40.9 kg, the polymerization was finished. Unreacted TFE was released to return the pressure in the autoclave to the atmospheric pressure, and thereafter, an obtained reaction product was washed with water and dried to thereby obtain 43.0 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the above physical properties were measured by the methods described above.

Experimental Example 5

51.8 L of pure water was charged in a 174 L-volume autoclave; nitrogen replacement was sufficiently carried out; thereafter, 40.9 kg of perfluorocyclobutane, 2.37 kg of perfluoro (propyl vinyl ether) (PPVE) and 1.47 kg of methanol were charged; and the temperature in the system was held at 35° C. and the stirring speed was held at 200 rpm. Then, tetrafluoroethylene (TFE) was introduced under pressure up to 0.64 MPa, and thereafter 0.103 kg of a 50% methanol solution of di-n-propyl peroxydicarbonate was charged to initiate polymerization. Since the pressure in the system decreased along with the progress of the polymerization, TFE was continuously supplied to make the pressure constant, and 0.052 kg of PPVE was additionally charged for every 1 kg of TFE supplied. When the amount of TFE additionally charged reached 40.9 kg, the polymerization was finished. Unreacted TFE was released to return the pressure in the autoclave to the atmospheric pressure, and thereafter, an obtained reaction product was washed with water and dried to thereby obtain 43.0 kg of a powder.

The obtained powder was melt extruded at 360° C. by a screw extruder (trade name: PCM46, manufactured by Ikegai Corp.) to thereby obtain pellets of a TFE/PPVE copolymer. The PPVE content of the obtained pellets was measured by the method described above.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above.

Comparative Experimental Example 1

Pellets were obtained as in Experimental Example 4, except for changing the charged amount of PPVE to 2.43 kg and methanol to 3.00 kg and additionally charging 0.053 kg of PPVE for every 1 kg of TFE supplied to obtain 43.1 kg of a dry powder.

Experimental Example 2

Pellets were obtained as in Experimental Example 1, except for changing the charged amount of pure water to 26.6 L, perfluorocyclobutane to 30.4 kg, PPVE to 0.93 kg and methanol to 4.20 kg, introducing TFE under pressure to 0.58 MPa, changing the charged amount of the 50% methanol solution of di-n-propyl peroxydicarbonate to 0.021 kg, adding 0.035 kg of PPVE for every 1 kg of TFE supplied, and changing the polymerization time to 8 hours to obtain 15 kg of a dry powder.

Comparative Experimental Example 3

Pellets were obtained as in Experimental Example 4, except for changing the charged amount of PPVE to 3.39 kg, methanol to 3.51 kg, and the 50% methanol solution of di-n-propyl peroxydicarbonate to 0.051 kg and additionally charging 0.070 kg of PPVE for every 1 kg of TFE supplied to obtain 43.7 kg of a dry powder.

Comparative Experimental Example 4

Pellets were obtained as in Experimental Example 4, except for changing the charged amount of PPVE to 2.75 kg, methanol to 3.79 kg, and the 50% methanol solution of di-n-propyl peroxydicarbonate to 0.051 kg and additionally charging 0.058 kg of PPVE for every 1 kg of TFE supplied to obtain 43.3 kg of a dry powder.

By using the pellets obtained in Experimental Examples and Comparative Experimental Examples, the above physical properties were measured by the methods described above. The results are shown in Table 3.

TABLE 3

| | PPVE content (wt %) | MFR (g/10 min) | Number of functional groups (number/C$10^6$) | Melting point (° C.) | Quantity of heat of melting (mJ/mg) |
|---|---|---|---|---|---|
| Experimental Example 1 | 4.5 | 26.0 | 289 | 304 | 29.6 |
| Experimental Example 2 | 4.9 | 30.4 | 303 | 302 | 27.8 |
| Experimental Example 3 | 5.5 | 26.0 | 289 | 302 | 25.0 |
| Experimental Example 4 | 4.8 | 34.0 | 312 | 303 | 28.4 |
| Experimental Example 5 | 4.9 | 30.4 | <6 | 302 | 27.8 |
| Comparative Experimental Example 1 | 5.0 | 43.0 | 333 | 302 | 30.0 |
| Comparative Experimental Example 2 | 3.4 | 26.0 | 289 | 309 | 33.5 |
| Comparative Experimental Example 3 | 6.5 | 28.0 | 295 | 300 | 21.2 |
| Comparative Experimental Example 4 | 5.5 | 20.0 | 265 | 302 | 24.0 |

The description "<6" in Table 3 means that the number of functional groups is less than 6.

Then, by using the obtained pellets, the following properties were evaluated. The results are shown in Table 4.

(Water Vapor Permeability)

A sheet test piece of about 0.2 mm in thickness was prepared by using the pellets and a heat-press forming machine. A test cup (permeation area: 12.56 $cm^2$) was charged with 18 g of water, covered with the sheet test piece, and clamped with a PTFE gasket interposed therebetween for sealing. The cup was retained at a temperature of 95° C. for 30 days so as to allow the sheet test piece to be in contact with water, then taken out, and allowed to stand at room temperature for 2 hours; thereafter, the reduction in the mass was measured. The water vapor permeability (g·cm/$m^2$) was determined by the following formula.

$$\text{Water vapor permeability (g·cm/m}^2\text{)} = \text{reduction in mass (g)} \times \text{thickness of sheet test piece (cm)} / \text{permeation area (m}^2\text{)}$$

(Amount of Recovery)

Approximately 2 g of the pellets was charged in a metal mold (inner diameter: 13 mm, height: 38 mm)), and melted by hot plate press at 370° C. for 30 min, thereafter, water-cooled with a pressure of 0.2 MPa (resin pressure) to thereby prepare a molded article of approximately 8 mm in height. Thereafter, by cutting the obtained molded article, a test piece of 13 mm in outer diameter and 6 mm in height was prepared. The prepared test piece was compressed to a compression deformation rate of 50% (that is, the test piece of 6 mm in height was compressed to a height of 3 mm) at normal temperature by using a compression device.

The prepared test piece was compressed to a compression deformation rate of 50% (that is, the test piece of 6 mm in height was compressed to a height of 3 mm) at a normal temperature by using a compression device. The compressed test piece fixed on the compression device was allowed to stand still in an electric furnace at 150° C. for 18 hours. The compression device was taken out from the electric furnace, and cooled to room temperature; thereafter, the test piece was dismounted. The collected test piece was allowed to stand at room temperature for 30 min; thereafter, the height of the collected test piece was measured and the amount of recovery was determined by the following formula.

Amount of recovery (mm)=$t_2-t_1$ $t_1$: a height of a spacer (mm)

$t_2$: a height of the test piece dismounted from the compression device (mm)

In the above test, $t_1$ was 3 mm.

(Storage Elastic Modulus at 150° C. (E'))

The storage elastic modulus was determined by carrying out dynamic viscoelasticity measurement using a DVA-220 (manufactured by IT Keisoku Seigyo K.K.). A heat-pressed sheet of 25 mm in length, 5 mm in width and 0.2 mm in thickness was used as a sample test piece, the measurement was carried out under the condition of a temperature-increasing rate of 2° C./min, a frequency of 10 Hz, and in the range of 30° C. to 250° C., and the storage elastic modulus (MPa) at 150° C. was identified.

(Surface Pressure at 150° C.)

The surface pressure at 150° C. was determined from the result of the compression set test at 150° C. and the result of the storage elastic modulus measurement at 150° C. by the following formula.

Surface pressure at 150° C. (MPa): $(t_2-t_1)/t_1\times E'$ $t_1$: the height of the spacer $t_2$: the height of the test piece dismounted from the compression device E': the storage elastic modulus at 150° C. (MPa)

(Carbon Dioxide Permeation Coefficient)

A sheet test piece of about 0.1 mm in thickness was prepared by using the pellets and a heat-press forming machine. By using the obtained test piece, the carbon dioxide permeability was measured in accordance with the method described in JIS K7126-1:2006 by using a differential pressure-type gas permeameter (model L100-5000 gas permeameter, manufactured by Systech Illinois Ltd.). The numerical value of the carbon dioxide permeability was obtained at a permeation area of 50.24 $cm^2$, a test temperature of 70° C., and a test humidity of 0% RH. The carbon dioxide permeation coefficient was calculated by using the obtained carbon dioxide permeability and the test piece thickness by the following formula.

Carbon dioxide permeation coefficient ($cm^3\cdot mm/(m^2\cdot 24\ h\cdot atm)$)=GTR×$d$ GTR: carbon dioxide permeability ($cm^3/(m^2\cdot 24\ h\cdot atm)$)

d: test piece thickness (mm)

(Long-Term Sealability Evaluation)

The measurement of the sealability was carried out according to the method described in ASTM D395 or JIS K6262:2013. A formed article of 13 mm in outer diameter and 8 mm in height was prepared by using the pellets and a heat-press forming machine. By cutting the obtained formed article, a test piece of 13 mm in outer diameter and 6 mm in height was prepared. The prepared test piece was compressed to a compression deformation rate of 50% at normal temperature in a compression device. The compressed test piece being fixed on the compression device was allowed to stand still in an electric furnace and heated at 65° C. for 72 hours. The compression device was taken out from the electric furnace, and cooled to room temperature; thereafter, the test piece was dismounted. The collected test piece was allowed to stand at room temperature for 30 min, and then the height of the collected test piece was measured. The collected test piece was compressed to a compression deformation rate of 50% at normal temperature again in the compression device. The compressed test piece being fixed on the compression device was allowed to stand still in an electric furnace and heated at 65° C. for 428 hours (cumulative heating time: 500 hours). The compression device was taken out from the electric furnace, and cooled to room temperature; thereafter, the test piece was dismounted. The collected test piece was allowed to stand at room temperature for 30 min, and then the height of the collected test piece was measured. The compression set rate was determined by the following formula.

Compression set rate (%)=$(t_0-t_2)/(t_0-t_1)\times 100$ $t_0$: an original height of the test piece (mm)

$t_1$: a height of a spacer (mm)

$t_2$: a height of the test piece dismounted from the compression device (mm)

In the above test, $t_0$ was 6 mm and $t_1$ was 3 mm.

Additionally, the rate of change in sealability was determined by the following formula.

Rate of change in sealability (%)=$(CS_{500}-CS_{72})/CS_{72}\times 100$ $CS_{72}$: compression set rate (%) by heating for cumulative 72 hours $CS_{500}$: compression set rate (%) by heating for cumulative 500 hours (Injection Moldability)

The copolymer was injection molded by using an injection molding machine (manufactured by Sumitomo Heavy Industries, Ltd., SE50EV-A) at a cylinder temperature of 390° C., a metal mold temperature of 170° C., and an injection speed of 50 mm/s. As the metal mold, a metal mold of Cr-plated HPM 38 (100 mm×100 mm×2.5 mmt, side gate) was used. The surface of the injection molded article was visually observed, and the surface smoothness was evaluated based on the following criteria.

2: The surface is smooth without roughening observed thereon.

1: Roughening is observed only on the surface of the portion that has been located near the gate of the metal mold.

0: Roughening is observed on the major portion of the surface.

(Water Vapor Leak Test)

The copolymer was injection molded by using an injection molding machine (manufactured by Sumitomo Heavy Industries, Ltd., SE50EV-A) at a cylinder temperature of 350 to 385° C. and at a metal mold temperature of 150 to 220° C. to thereby obtain a gasket of ϕ17.7 mm in outer diameter, ϕ14.3 mm in inner diameter and 1.6 mmt in thickness.

Figure 5:
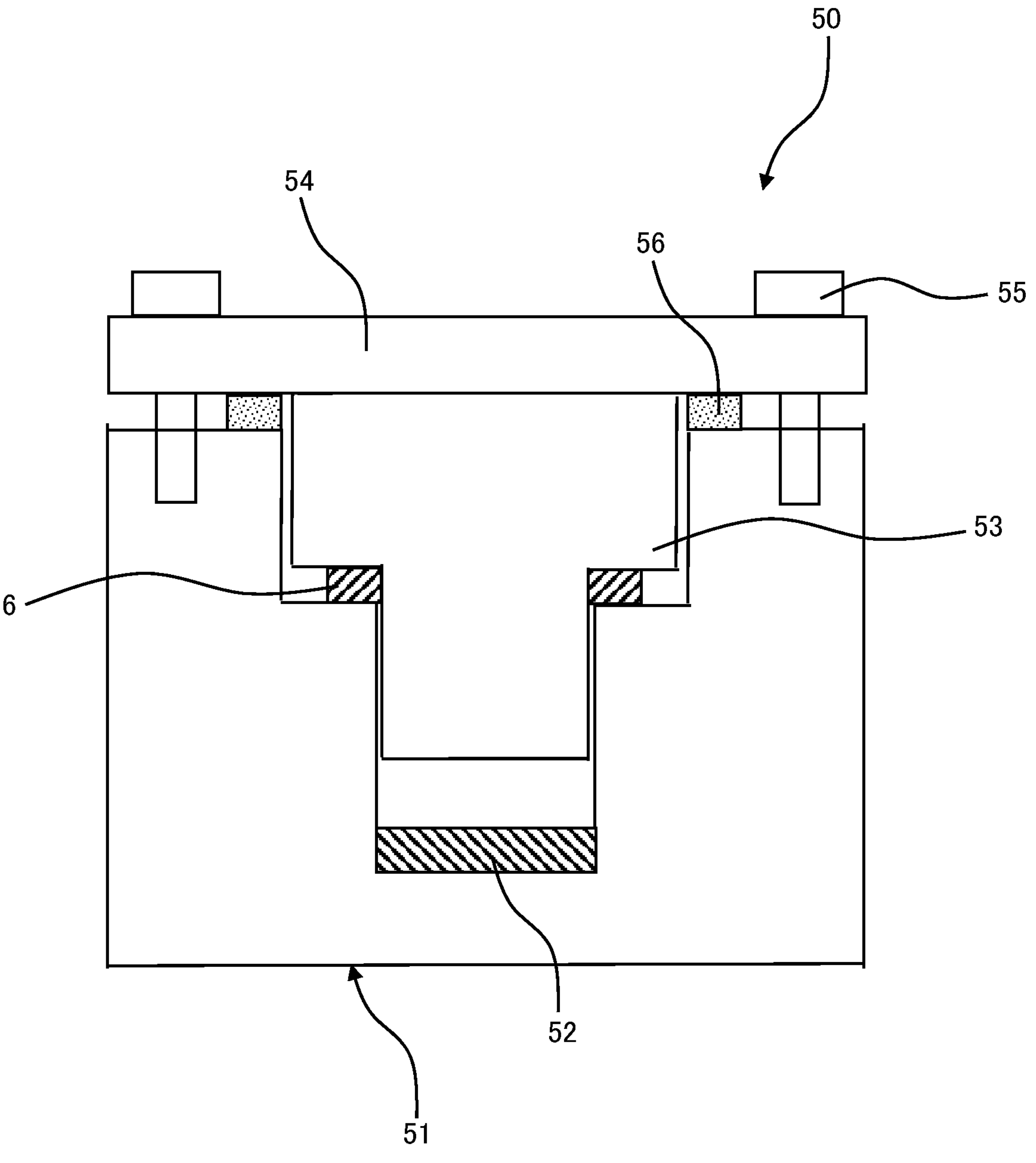
FIG. 5 is a schematic cross-sectional view of a test jig used in a water vapor leak test.

As illustrated in FIG. 5, 2 g of water 52 was put in an aluminum alloy cup 51. A gasket 6 was assembled between the cup 51 and a gasket compression jig 53; the lid 54 was fastened with bolts 55 to compress the gasket 6. A spacer 56 was disposed between the lid 54 and the cup 51 and the compression deformation rate of the gasket 6 was adjusted to 50%. The mass of a test jig 50 thus obtained was measured. The test jig 50 was charged in a thermostatic chamber heated at 95° C., and after 1,000 hours of being allowed to stand therein, taken out and allowed to stand at room temperature for 2 hours; thereafter, the mass was measured. The amount of water vapor leakage was determined by the following formula. This operation was five times repeated and the average value of the amount of water vapor leakage was determined. In Table 4, the average values are described.

amount of water vapor leakage (g/1,000 h)=(a mass of the test jig before being heated)−(a mass of the test jig after being heated)

TABLE 4

| | Water vapor permeability 95° C. 30 days (g · cm/m$^2$) | E' 150° C. (MPa) | Amount of recovery (mm) | Surface pressure 150° C. (MPa) | $CO_2$ permeation coefficient cm$^3$ · mm/ (m$^2$ · 24 h · atm) | Rate of change in long-term sealability | Injection moldability | Water vapor leak test Amount of water vapor leakage (g/1,000 hrs) |
|---|---|---|---|---|---|---|---|---|
| Experimental Example 1 | 9.4 | 108 | 0.013 | 0.47 | 1585 | 6% | 2 | 0.0031 |
| Experimental Example 2 | 10.2 | 95 | 0.009 | 0.29 | 1620 | 6% | 2 | 0.0032 |
| Experimental Example 3 | 11.3 | 86 | 0.009 | 0.26 | 1743 | 6% | 2 | 0.0033 |
| Experimental Example 4 | 9.5 | 101 | 0.008 | 0.27 | 1583 | 6% | 2 | 0.0033 |
| Experimental Example 5 | 10.2 | 95 | 0.01 | 0.32 | 1425 | 6% | 2 | 0.0032 |
| Comparative Experimental Example 1 | 9.4 | 102 | 0.002 | 0.07 | 1571 | 6% | 2 | 0.0038 |
| Comparative Experimental Example 2 | 7.8 | 134 | 0.023 | 1.03 | 1415 | 8% | 2 | 0.0028 |
| Comparative Experimental Example 3 | 13.0 | 78 | 0.003 | 0.08 | 1900 | 6% | 2 | 0.0041 |
| Comparative Experimental Example 4 | 12.0 | 82 | 0.012 | 0.33 | 1792 | 8% | 0 | 0.0032 |

REFERENCE SIGNS LIST

10 POWER STORAGE ASSEMBLY
1 EXTERIOR CAN
2 LID
3 BOTTOM FACE
4A FIRST EXTERNAL TERMINAL
4B SECOND EXTERNAL TERMINAL
5 PLUG
6 SEALING MEMBER
61 CYLINDRICAL PART
62 FLANGE PART
63 SIDE WALL PART
7 INSULATING MEMBER
50 TEST JIG

What is claimed is:

1. A sealing member containing a copolymer consisting of tetrafluoroethylene unit, a perfluoro (propyl vinyl ether) unit, and an optional unit derived from a molecule copolymerizable with the tetrafluoroethylene and the perfluoro(propyl vinyl ether), wherein the copolymer has a content of the perfluoro(propyl vinyl ether) unit of 4.0 to 6.0% by mass with respect to the whole of the monomer units, a content of the tetrafluoroethylene unit of 94.0 to 96.0% by mass with respect to the whole of the monomer units, a content of the optional unit of 0 to 0.5% by mass with respect to the whole of the monomer units, a melt flow rate of 26 to 37 g/10 min at 372° C., and a total number of functional groups of —CF═$CF_2$, —$CF_2$H, —COF, —COOH, —$COOCH_3$, —$CONH_2$ and —$CH_2$OH is more than 50 and 800 or less per $10^6$ main-chain carbon atoms, wherein the sealing member has a thickness of 0.5 to 2.5 mm and a sealing area of 0.5 to 50 cm$^2$, and wherein the sealing member is in a state of being compressed at a compression deformation rate of 20 to 60%.

2. The sealing member according to claim 1, wherein the copolymer has a melting point of 301 to 317° C.

3. The sealing member according to claim 1, wherein the copolymer has a quantity of heat of melting of 24.0 mJ/mg or higher.

4. The sealing member according to claim 1, wherein the copolymer has a fluorine content of less than 70 mol %.

5. The sealing member according to claim 1, being an injection molded article or a transfer molded article.

6. A power storage assembly comprising the sealing member according to claim 1.

7. The power storage assembly according to claim 6, the power storage assembly comprising:

an exterior can;
an electric element housed in the exterior can;
a lid to close an opening of the exterior can; and
an external terminal installed on the lid, wherein
the sealing member is held between the lid and the external terminal.

8. The sealing member according to claim 1, wherein the copolymer has a melt flow rate at 372° C. of 28 to 37 g/10 min.

* * * * *